US006694436B1

(12) United States Patent
Audebert

(10) Patent No.: US 6,694,436 B1
(45) Date of Patent: Feb. 17, 2004

(54) TERMINAL AND SYSTEM FOR PERFORMING SECURE ELECTRONIC TRANSACTIONS

(75) Inventor: Yves Audebert, Los Gatos, CA (US)

(73) Assignee: Activcard, Suresnes Cedex (FR)

( * ) Notice: Subject to any disclaimer, the term of this patent is extended or adjusted under 35 U.S.C. 154(b) by 0 days.

(21) Appl. No.: 09/313,995

(22) Filed: May 19, 1999

(30) Foreign Application Priority Data

May 28, 1998 (FR) ............................................. 98 06450

(51) Int. Cl.[7] .............................. G06F 11/00; G07F 7/10
(52) U.S. Cl. ....................... 713/200; 713/201; 707/511; 707/203
(58) Field of Search ................................. 713/201, 200, 713/202, 155, 168, 167, 172, 164; 705/44, 54, 57; 709/224, 225, 223, 229, 201; 902/1, 38

(56) References Cited

U.S. PATENT DOCUMENTS

| 4,442,484 | A |   | 4/1984  | Childs, Jr. et al. |         |
|-----------|---|---|---------|--------------------|---------|
| 4,731,842 | A |   | 3/1988  | Smith              |         |
| 4,814,972 | A | * | 3/1989  | Winter et al.      | 709/227 |
| 4,951,249 | A | * | 8/1990  | McClung et al.     | 713/202 |
| 5,073,933 | A |   | 12/1991 | Rosenthal          |         |
| 5,438,184 | A | * | 8/1995  | Roberts et al.     | 235/380 |
| 5,446,864 | A |   | 8/1995  | Burghardt et al.   |         |
| 5,534,857 | A | * | 7/1996  | Laing et al.       | 340/5.74|
| 5,748,740 | A |   | 5/1998  | Curry et al.       |         |
| 5,757,918 | A | * | 5/1998  | Hopkins            | 705/67  |
| 5,773,804 | A | * | 6/1998  | Baik               | 235/379 |
| 5,848,233 | A | * | 12/1998 | Radia et al.       | 713/201 |
| 5,892,211 | A | * | 4/1999  | Davis et al.       | 235/380 |
| 6,067,621 | A | * | 5/2000  | Yu et al.          | 713/172 |
| 6,424,718 | B1| * | 7/2002  | Holloway           | 380/277 |
| 6,424,979 | B1| * | 7/2002  | Livingston et al.  | 707/511 |

FOREIGN PATENT DOCUMENTS

| EP | 0368752 | 5/1990  |
|----|---------|---------|
| FR | 2676291 | 11/1992 |
| FR | 2750275 | 12/1997 |
| WO | 9504328 | 2/1995  |
| WO | 9629667 | 9/1996  |
| WO | 9750207 | 12/1997 |
| WO | 9819237 | 5/1998  |

OTHER PUBLICATIONS

PCT International Preliminary Examination Report dated Feb. 28, 2000.
"C–ZAM/PC PC chipcard reader for secure internet payments, User's Guide", Banksys, pp. 3–17.

(List continued on next page.)

Primary Examiner—Ly V. Hua
(74) Attorney, Agent, or Firm—Stevens, Davis, Miller & Mosher LLP

(57) ABSTRACT

The terminal includes a terminal module (1) and a personal security device (31). The terminal module (1) is adapted to receive high-level requests from an application (Fap) installed on an electronic unit. The high-level requests are independent of the personal security device (31).

The terminal module (1) and/or the personal security device (31) includes a reprogrammable memory for storing and a unit for executing a filter program (F) translating the high-level requests into at least one of either (i) at least one sequence of exchanges of data between the terminal module (1) and the user or (ii) a sequence of at least one elementary command that can be executed by the personal security device, together with a unit for protecting the filter program (F, 62) to prevent any modification of the filter program by an unauthorized entity. The filter program includes a unit for identifying and/or authenticating the source of requests sent by the application (Fap) installed in the electronic unit.

40 Claims, 14 Drawing Sheets

OTHER PUBLICATIONS

"Interoperable C–SET, A Business Description", Banksys/Groupement des Cartes Bancairs, Issue 2.1, Aug. 28, 1997, pp. 1–52.

"Interoperable C–SET, Requirements for a Secure IC Card Reader", Banksys, Version 2.1, Sep. 23, 1997, pp. 1–38.

"Interoperable C–SET, Evaluation and Review Report on the Interoperable C–SET Forum", Banksys, Issue 1.3, Jan. 22, 1998, pp. 1–13.

"Commerce Electronique Specifications du Lecteur Securise de Cartes a Microcircuit", Groupement des Cartes Bancaires, Version 1., Feb. 1997, pp. 1–56.

"Chip–Secured Electronic Transactions (C–SET), Architecture de securite", GIE Cartes Bancaires, Version 1.0, Dec. 26, 1996, pp. 1–41.

"Commerce Electronique, Specifications du Protocole d'Echanges entre L'Equipement Porteur et le Lecteur Securise de Cartes a Microcircuit", Groupment des Cartes Bancaires, Version 1.0, Feb. 1997, pp. 1–23.

Notice of Opposition to EP1004101B1, dated Nov. 26, 2002, with Preliminary Remarks Concerning Priority (w/Engl. trans.) and Memo. of the Opponent (w/Engl. trans.).

Register Entry (Eng. trans.) for EP 0368752.

Memoire de L'Opposante, EP 1004 101 B1, pp. 1–47.

Opposition au Brevet European, EP 1004 101 B1, pp. 1–9.

English translation of Memorandum of the Oppenent, EP 1004 101 B1, pp. 1–32.

English translation of Opposition to European Patent EP 1 004 101 granted Feb. 27, 2002, pp. 1–9, Nov. 26, 2002.

English translation of Notice of Opposition to a European Patent, dated Nov. 26, 2002, pp. 1–4.

Opposition a un Brevet European, pp. 1–4, Nov. 26, 2002.

* cited by examiner

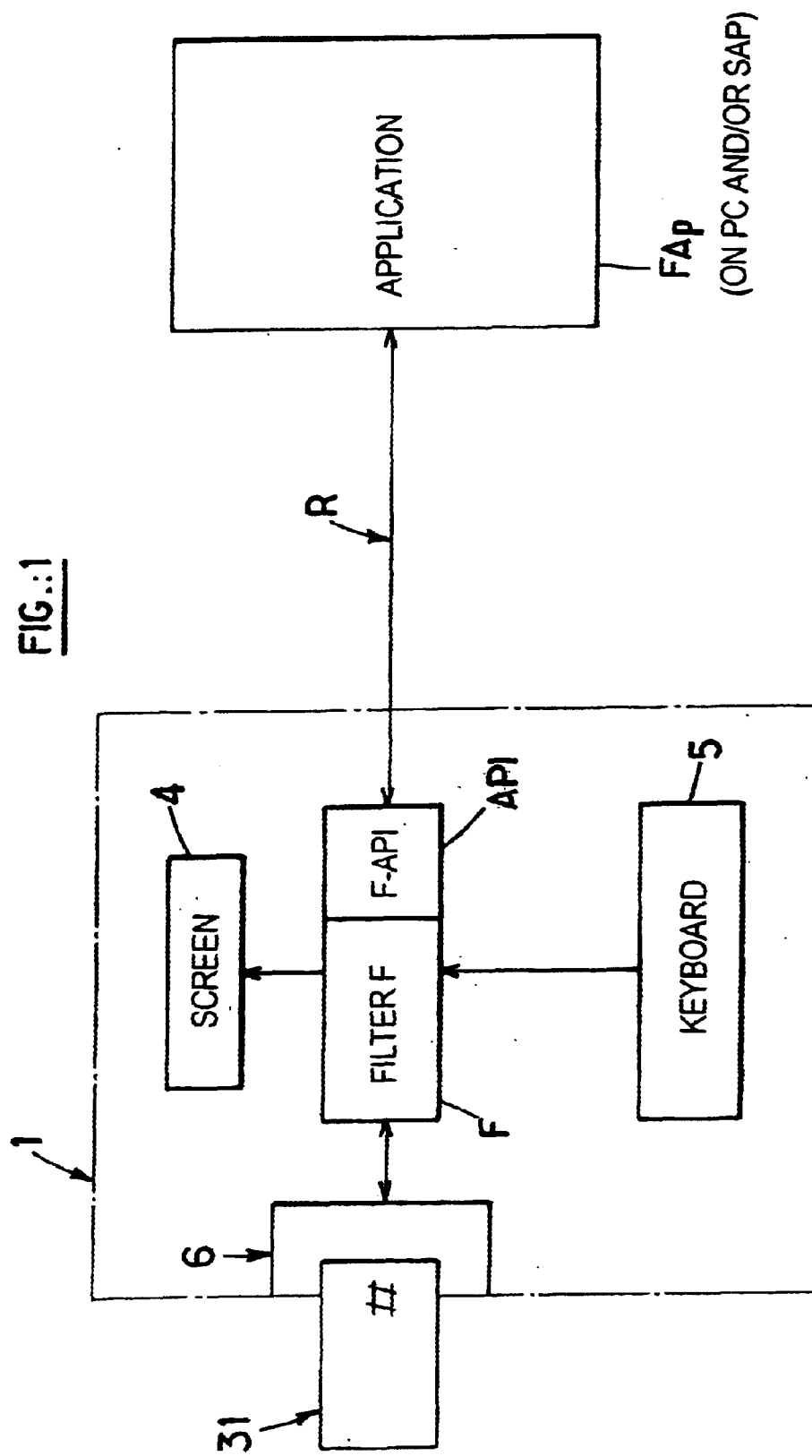

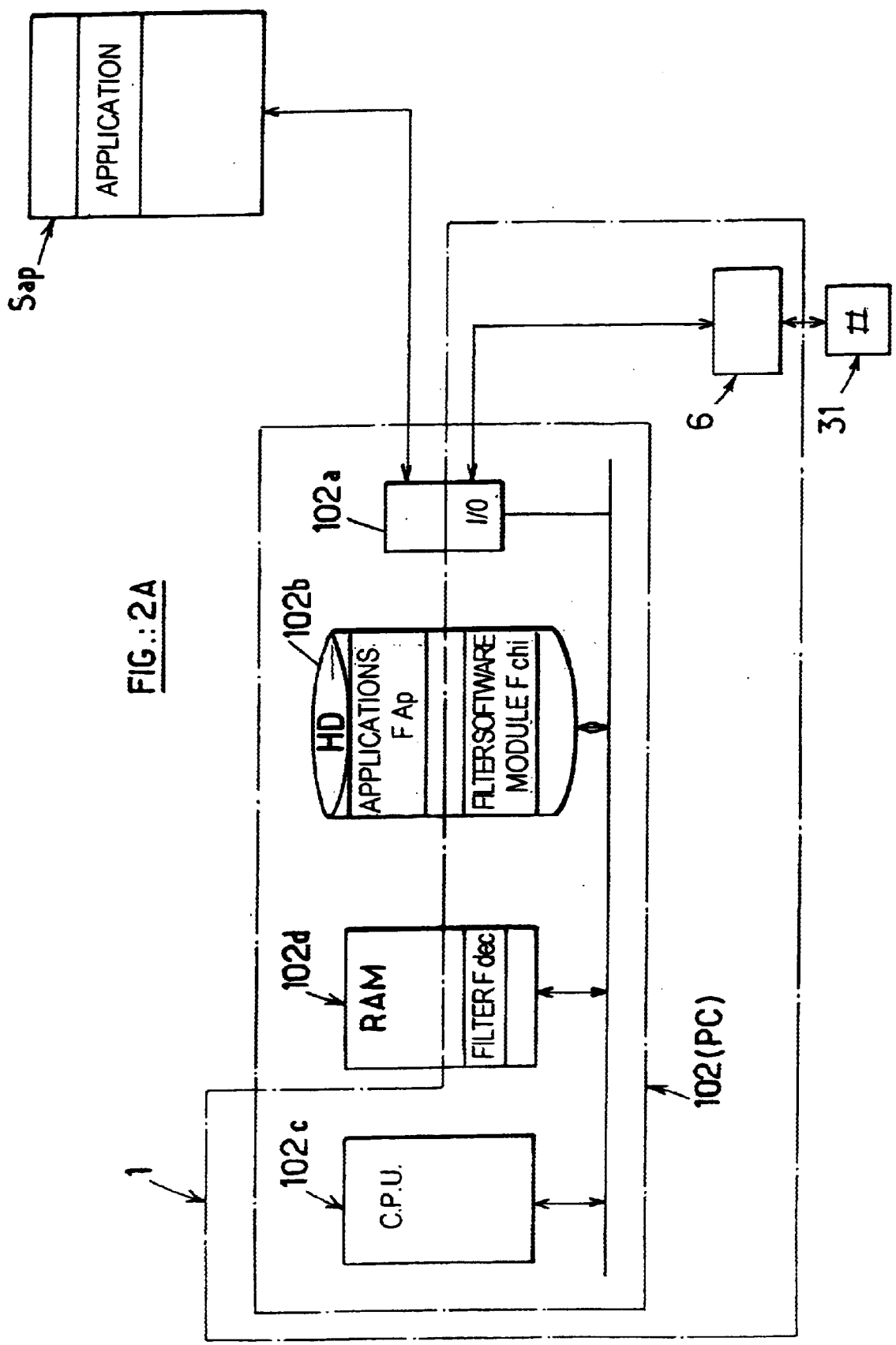

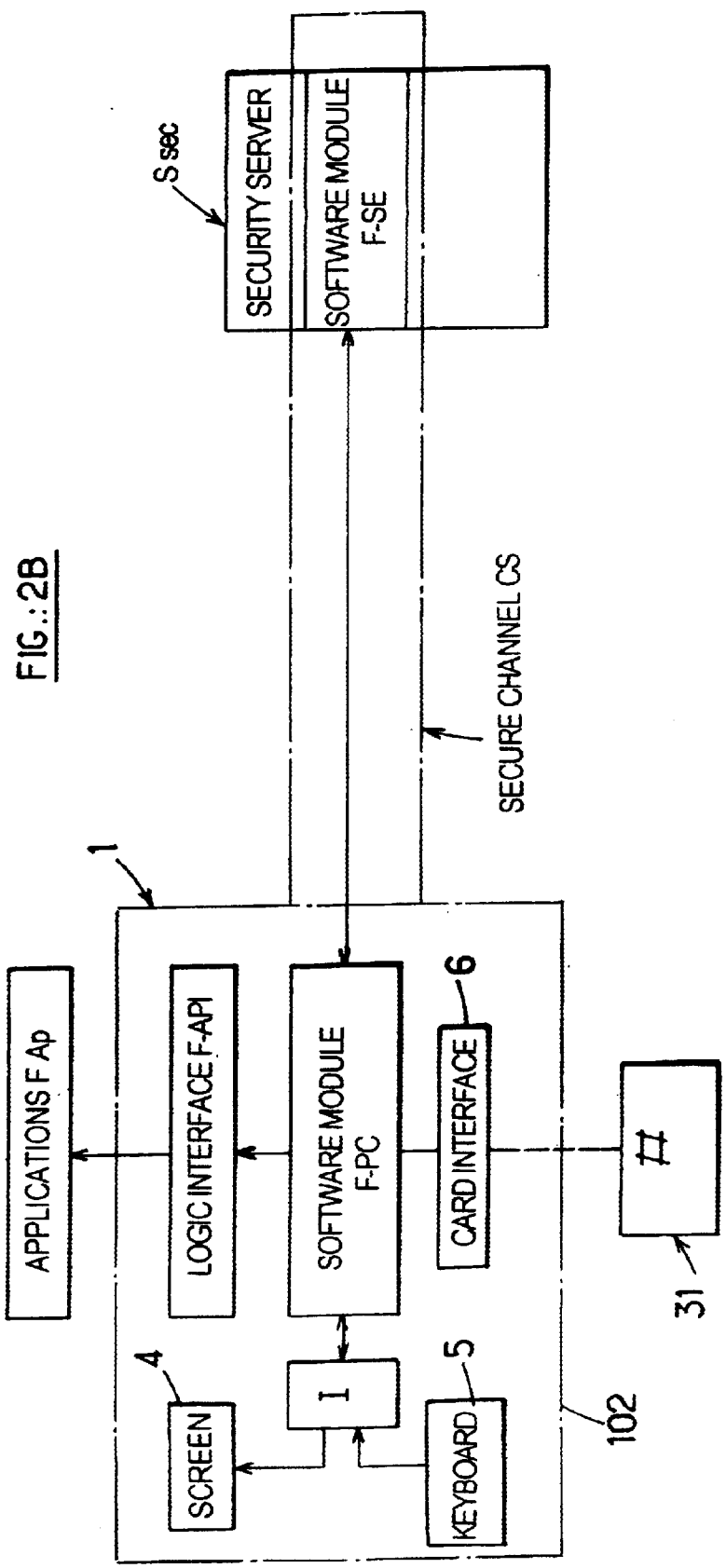

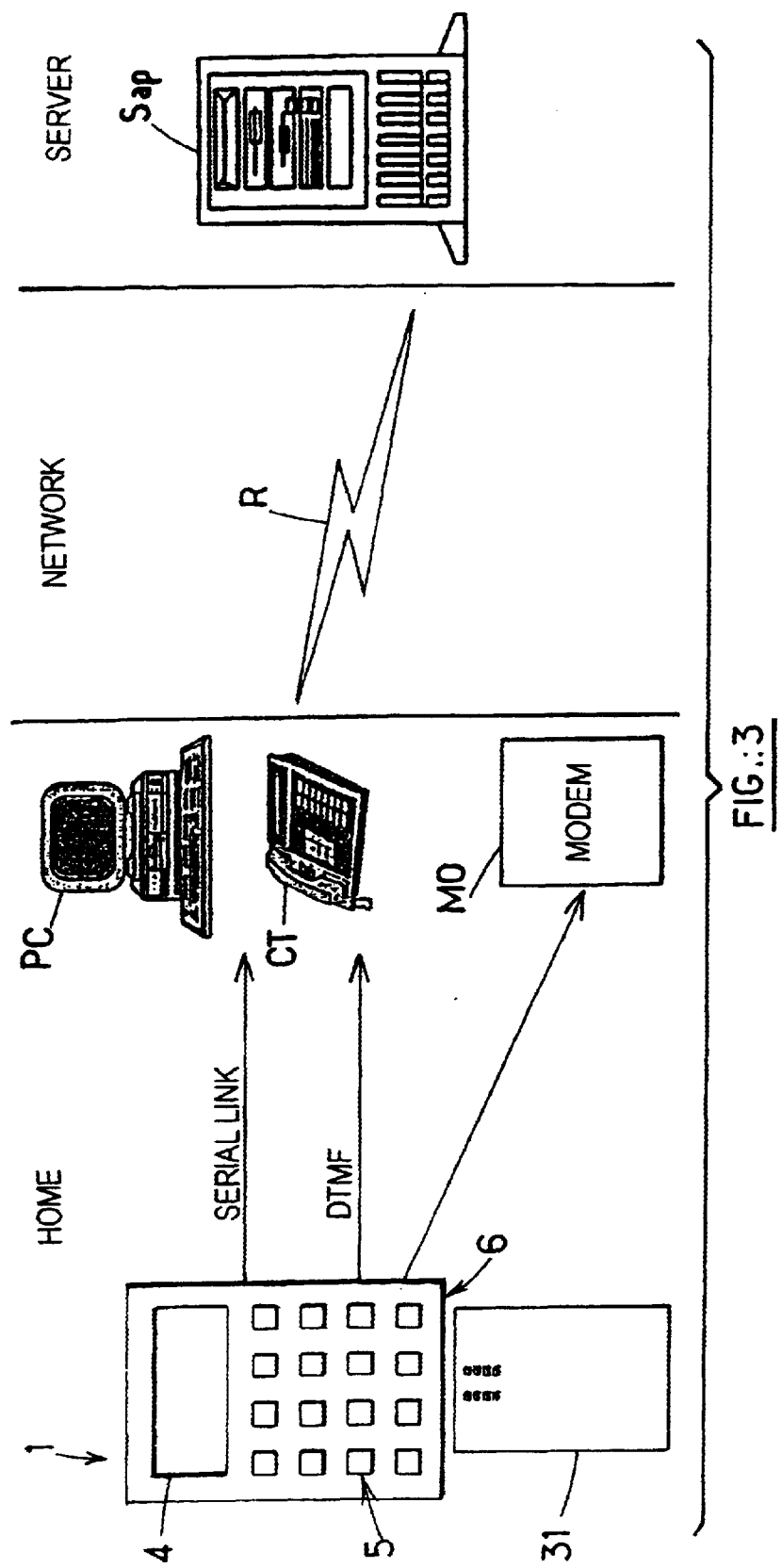

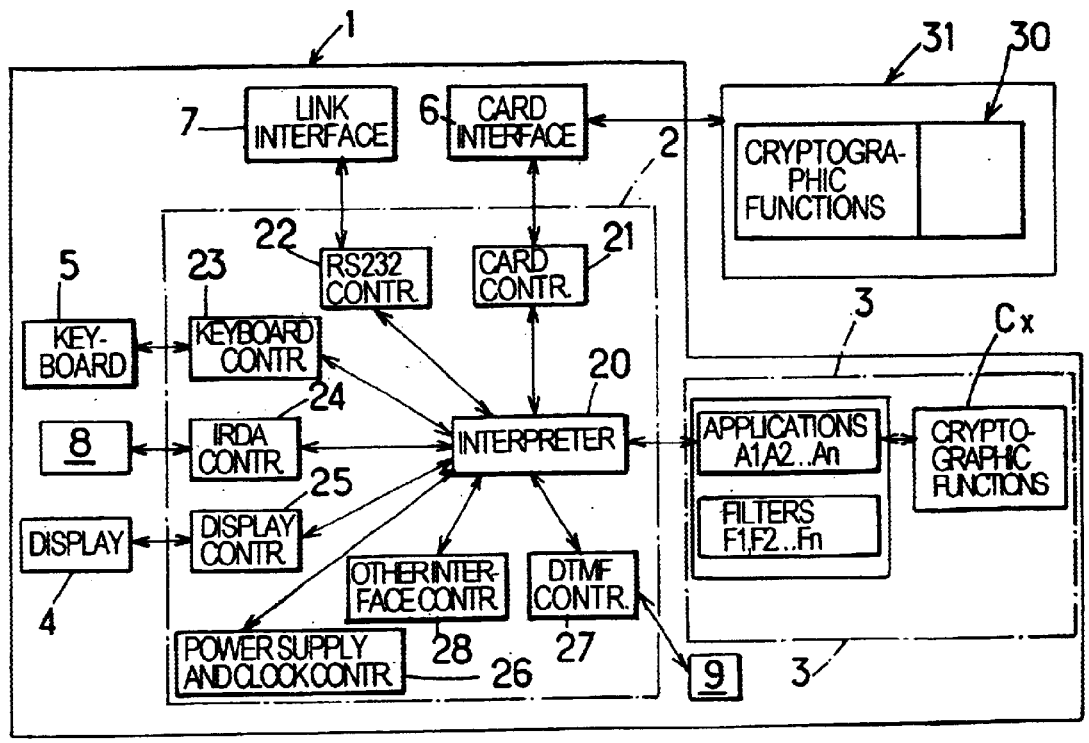
FIG.: 4B
FIG.: 4C
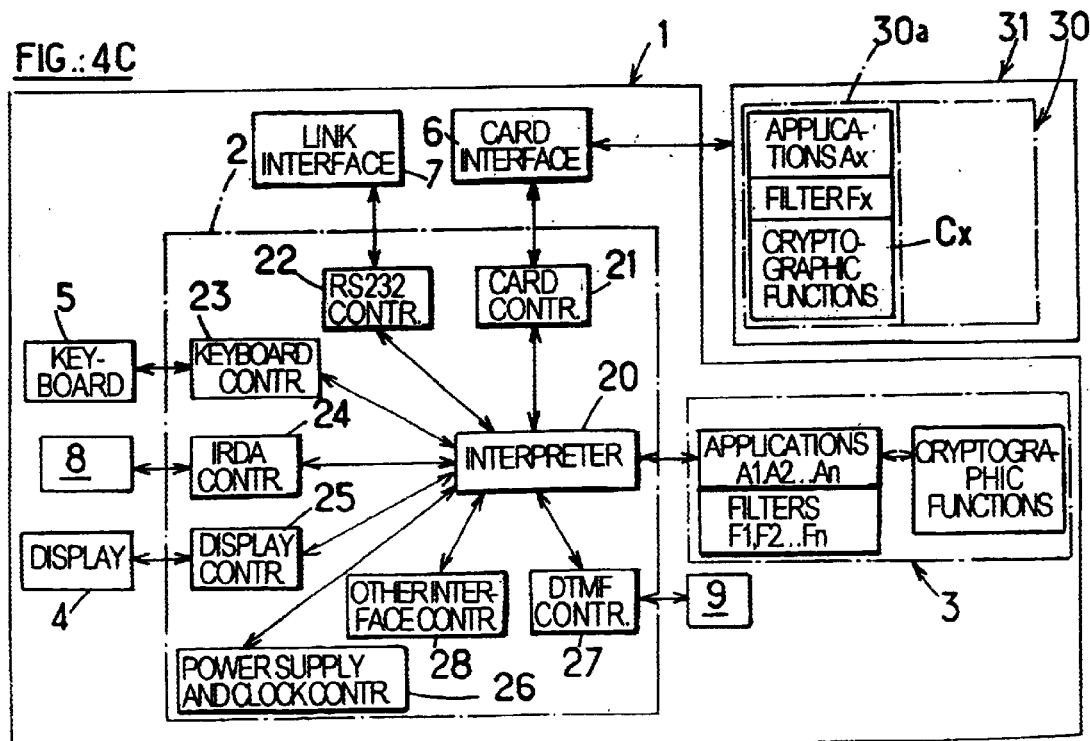

TERMINAL AND SYSTEM FOR PERFORMING SECURE ELECTRONIC TRANSACTIONS

BACKGROUND OF THE INVENTION

1. Field of the Invention

The present invention concerns a terminal and a system for performing secure electronic transactions.

2. Description of the Related Art

Public digital data transmission networks, such as the Internet, are expanding at a considerable: rate. However, the performing of secure electronic transfers on this type of network is currently being hampered, among other things, by the lack of security mechanisms associated with such transactions, reflected in a lack of confidence on the part of network users and operators.

In the context of this application:

- an electronic transaction designates an exchange of information via a public digital data transmission or telecommunication network, either between two or more users or between a user and a service provider,
- a function is a process carried out in order to render a service to a user,
- an application designates a consistent set of services and functions,
- the expression "application software" designates the software needed to perform the functions relating to a given application, and
- a secure transaction is a transaction for which security measures are implemented, namely authentication of the entities participating in the transaction, integrity, confidentiality, authenticity and possibly non-repudiation of exchanges and operations effected in the context of the transaction.

Many applications require secure electronic transactions. Examples are controlling access to computer or similar resources, home banking (statements, transfers between accounts, etc . . . via the telephone network or the Internet), electronic trading (purchase of goods or services via a public network), electronic mail, electronic purse, etc.

These and other applications requiring secure transactions are well known to the skilled person and are not described in detail here.

Depending on their nature, rendering such applications secure necessitates the use of one or more security services such as:

- authentication, to guarantee the identity of an entity (a person or a system);
- access control, protecting against unauthorised use or manipulation of resources;
- confidentiality, prohibiting disclosure of data to unauthorised entities;
- data integrity, which assures that data has not been modified, deleted or substituted without authorisation, and
- non-repudiation, which assures that a participant in an exchange of data cannot subsequently deny the existence of the exchange.

The combination of two existing techniques makes it feasible to employ the above security services, so offering a sufficient level of security for the performance of electronic transactions.

These are:

- public key and private key cryptography, because it guarantees non-repudiation and facilitates management of keys; and
- the integrated circuit (or smart) card, because it is relatively inexpensive, easy to use and reliable because it uses dedicated microprocessors with hardware and software protection features so that read and write mode access to their memory can be barred.

Integrated circuit cards offer the following services:

- authentication of the cardholder or user: this operation authenticates the cardholder by means of a confidential code after which the card allows operations such as executing algorithms, reading secret keys, reading or writing data on the card, which can also be subject to other security conditions;
- protection of data and functions stored on the integrated circuit card. Access to the card can be subject to prior authentication of the electronic entity requesting to access it. This external authentication is generally effected in challenge/response mode. In this case the entity has a secret parameter, hereinafter also called the secret, enabling it to calculate, depending on a challenge issued by the card, a response that will prove to the card that it is in possession of the secret;
- execution of cryptographic algorithms using a secret parameter stored on the card (encipherment, message authentication, signature); and
- internal authentication. This service enables an application to authenticate the card. This service is the inverse of external authentication. The card generates a response to a challenge received, using a secret stored on the card.

The services offered by means of the integrated circuit card are performed on receipt of so-called elementary commands, execution of the elementary command causing the sending of elementary responses. The elementary commands concern, for example, cryptographic calculations, reading or writing of secret or other data, intervention of the user (entry of their personal confidential code (PIN), validation of a transaction after signature), and return of information to the user (display of messages to be signed, for example).

Some cards offer the facility to verify the integrity, source and even the confidentiality of commands sent to the card. These services are based on techniques of authenticating and enciphering the commands.

The current use of integrated circuit (or microcircuit) cards offers a very high level of security because the transactions are essentially performed on private networks and terminals (automatic teller machines, point of sale terminals, for example) which are under the control of an entity assuring the security of the system as a whole.

In such applications, users or abusers do not have access to the application software or to the hardware and software security mechanisms of the terminals.

In contrast, performing secure transactions using integrated circuit cards on a public network presupposes that users have access to a card reader terminal module, given that microcircuit cards do not have their own electrical power supply and that using them requires a reader that can power them up and establish communication with the user and/or external electronic means.

At present, to perform a transaction on a public network, the user employs a terminal that can be a dedicated product, a personal computer or a personal computer connected to an integrated circuit card by a card reader.

In all cases, the transaction system accessible to the user generally comprises:

an application service provider, for example an Internet browser, an electronic mail program, a home banking program, a high-level security service provider enabling execution of low-level cryptographic mechanisms required by the application.

The application service provider issues requests for high-level security services to assure the security of the transactions performed.

If the application is installed on the user's personal computer, the cryptographic services referred to are, for example, those defined by RSA laboratories in its standard "PKCS 11: Cryptographic Token Interface Standard" or the cryptographic services offered by the Microsoft Windows NT operating system, in particular those available via the "Crypto API" application program interface (API).

If the user does not have an integral microcircuit card reader, the cryptographic services are effected entirely by software.

If the user wishes to enhance security, they use a transparent type integrated circuit card reader connected to their computer. A transparent type card reader is in fact an interface module between the computer and the integrated circuit card for transmitting elementary commands from the computer, originating from the cryptographic service provider, to the card, and elementary responses from the card to the computer. Using this terminal, consisting of their terminal module–computer+reader–coupled to their card, a user can perform electronic transactions (electronic shopping, for example).

Of course, access of users to a terminal of this kind generates potential security risks.

The more decentralised the applications the greater the risk. Conversely, the better the control of the risks at the terminal end, the more decentralised can the applications be. Consider purse type applications, for example, in which transactions (purchaser card debit/merchant card credit) are effected card-to-card, without requiring consolidation of the transactions at the level of a centralised server.

It follows from the foregoing discussion that a terminal can potentially contain a set of information (or even software) on whose confidentiality and integrity the security of the application relies. Consider, for example, secret keys used to authenticate the terminal modules vis a vis the card or to encipher data transferred between a server and the card reader terminal module. An abuser with access to the terminal can analyse its operation and obtain access to the confidential information and software.

Note also that the applications referred to here, such as electronic shopping and electronic mail, are usually performed via the Internet. Experts are well aware that a personal computer (PC) connected to the Internet is highly vulnerable to viruses which can be installed and execute on the user's PC without them knowing it and without them allowing physical access to their computer to anyone at all. The totally invisible nature of this type of threat is the real danger currently limiting the deployment of transaction-based applications using the Internet. The same comments apply to electronic shopping applications on cable TV networks using set-top boxes connected to the TV set and incorporating one or two smart card readers.

The system level risks are then:

Attack on the integrity of the cryptographic service provider and the application service provider with the aim of modifying the behaviour of the terminal module: for example, the terminal module is modified to capture information associated with the card and to store the information obtained for subsequent communication to a counterfeit server. This attack can be carried out unknown to the legitimate user (substitution of the user's terminal module or loan of a modified terminal module). This attack can then be generalised by circulating counterfeit terminal modules.

Attack on the confidentiality of the cryptographic service provider, with the aim of obtaining the cryptographic keys they use, which are stored on the hard disk of a computer, for example.

Attack on other cards, based on the ability to authenticate the abuse vis a vis other cards by virtue of the secrets discovered by attacking the confidentiality of the service provider.

Attack on the integrity and the confidentiality of communications between the various entities (application service providers, cryptographic service providers, integrated circuit card reader, integrated circuit card, server) to break the chain of confidence established between these elements. For example:
1—deciphering communications between server and terminals;
2—inserting third party software between the application service provider and the cryptographic service provider to break the chain of confidence between these two programs or to substitute for the application software third party software causing the security service provider to execute security requests with a different aim to that of the application known to the user.

Attack on servers (in the case of an on-line application): connection of a counterfeit terminal to a server, emulation of a terminal module/integrated circuit card combination to obtain advantages.

An attack on the chain of confidence between the cryptographic service provider and the application service provider in the context of an application requiring an electronic transaction using an integrated circuit card to be signed is illustrated hereinafter. The transaction proceeds as follows:

Step 1: verification of the personal confidential code (PIN) of the user, entered by the latter via a keypad associated with their terminal module, the code entered being sent to the card for verification by the latter.

Step 2: authentication of the terminal module. The latter sends a "challenge request" command (a challenge is a random or pseudo-random number). The integrated circuit card generates the challenge and sends it to the terminal module. The terminal module sends the card an "external authentication" command accompanied by a response consisting of the challenge enciphered by a key held by the terminal module. The integrated circuit card then verifies the response received.

Step 3: if steps 1 and 2 are executed satisfactorily, the integrated circuit card is ready to receive and to execute the signature command, i.e. command of encipherment, using a private key stored on the card, of the result of a hashing operation performed on the transaction entered by the user. After this encipherment the card sends to the terminal module the signature consisting of the result of the hashing operation enciphered in this way.

If the integrity of the application software (application service provider and its cryptographic service provider) is not assured, a hacker does not need to know the secret code and keys to pirate the transaction system; all that is necessary is to implant in the terminal module, for example the personal computer to which an integrated circuit card reader is connected, virus type software which in step 3 diverts the authentic data to be signed and sends falsified data to the card. Given that steps 1 and 2 have been executed in a satisfactory manner, the card will then sign the falsified data on the basis of the PIN that the user has entered and the user will believe that the card is about to sign their own data.

The preceding example shows the necessity of protecting not only the confidential information used in the context of a transaction but also the integrity of the transaction, i.e. the integrity of the behaviour of each entity involved in the transaction, together with the integrity of the behaviour of all of the software, assuring that the chain of confidence established between the various entities is broken.

The risks of attack mentioned hereinabove are currently covered in part by terminals—integrated circuit card readers integrating security modules (SAM, similar to an integrated circuit card) used in the context of purse applications in particular. The reader is then personalised by a SAM and assigned to a merchant, the cards read being those of customers. The SAM contains secret information and is able to execute algorithms using the secret information. However, it does not contain means for controlling communication with the user, with the integrated circuit card and/or with external electronic means, and for this reason the security of transactions is not assured.

Document WO 95/04328 discloses a terminal module comprising user interface means and interface means to external electronic means (hereinafter called external interface means) including an interface with a microcircuit card. The microprocessor of the terminal module comprises data storage means (ROM, EEPROM, RAM). The data stored in permanent memory (ROM) includes an operating system, managers of external components controlling the interfaces and peripheral devices, and an interpreter capable of interpreting program modules written in a specific language. The program modules are stored in the semi-permanent memory EEPROM and can be loaded into temporary memory RAM to be executed by the microprocessor on activation of an appropriate interface by the user. The program modules corresponding to the applications of the terminal module are downloaded into the EEPROM of the microprocessor or into a microcircuit card from an external server.

The terminal module of document WO 95/04328 can operate:
  in autonomous terminal module mode, the microprocessor of the terminal module executing a program module stored in an internal memory without calling on an integrated circuit card;
  in autonomous terminal mode, in which a program module stored on a card is executed;
  in extended terminal mode or on-line mode, in which the microprocessor of the terminal module or that of the card executes a program module and communication is established via the telephone, a modem or a direct connection to a service provider or a server; and
  in transparent memory card reader mode, in which instructions received over a serial link are sent directly to the card and vice versa.

The terminal described in document WO 95/04328 does not deal with security problems addressed by the invention in that there is no description of how to secure a transaction to guarantee the integrity of the behaviour of all of the software executing the transaction. In particular there is no description of means for executing high-level requests issued by the application or how to guarantee the source, the integrity and the confidentiality of such means.

SUMMARY OF THE INVENTION

The present invention aims to provide a terminal for carrying out secure electronic transactions of the type comprising a personal security device such as an integrated circuit card or other device fulfilling the same functions and a terminal module provided with means of interfacing the personal security device, such as an integrated circuit card reader, and offering by virtue of its software and/or hardware architecture and the security mechanisms that it includes an enhanced level of security compatible with the fact that the terminal can be under the control of users (as opposed to terminals under the control of the operators).

A second objective of the invention is to assure this same level of security whilst enabling integration, during use, of new functions or applications, or modification of existing functions or applications without having recourse to a multitude of different terminal modules and without changing terminal modules to effect such modifications.

To this end, the invention consists in a terminal for execution of secure electronic transactions by a user in conjunction with at least one application installed on an electronic unit, said terminal comprising:
  a terminal module including at least:
    first interface means with said application for receiving from it requests relating to said transactions,
    second interface means with said user;
    third interface means with a personal security device,
    first data processing means comprising at least first software means for controlling said interface means, and
  a personal security device including at least second secure data processing means comprising at least second software means for executing elementary commands and means for executing cryptographic computations, characterised in that:
  said terminal is adapted to receive said requests from said application installed on said electronic unit in the form of high-level requests independent of said personal security device,
  at least one of said terminal module and said personal security device comprises:
    at least one reprogrammable memory for storing at least one filter program translating said high-level requests into at least one of either (i) a sequence of at least one elementary command for being executed by said second software means of said second data processing means, or (ii) a sequence of data exchanges between said terminal module and said user via said second interface means, said data exchanges being executed by said first software means of said first data processing means, and
    means for protecting said filter software to prevent an unauthorised person reading and/or modifying said software, and
  at least one of said first and said second data processing means comprise a data processing device for executing said filter program.

The invention defined hereinabove achieves the security objectives required for carrying out electronic transactions by virtue of the fact that it describes a filter or "firewall" between the external world, i.e. the applications themselves, and the security means and peripheral devices that it controls, by means of a logical interface defining the format of high-level requests issued by the applications and of a translation software for processing these requests.

The terminal of the invention preferably comprises one or more of the following features, possibly in combination:

said device for executing the filter program comprises first means for identifying and/or authenticating said application installed on said unit or the source of said requests sent by said application, said data processing device for executing said filter program comprises means for verifying the integrity of data received from said application, said data processing device for executing said filter program comprises centralised means for controlling conditions of use of services of the personal security device in accordance with said application and/or the user, said data processing device for executing said filter program comprises:
    means for commanding secured loading of said filter program into said programmable memory via said first or said third interface means from an entity external to said module, and
    first access control means for authorising said loading of said filter program only in response to at least one predefined condition, the terminal comprises second means for authentication of said first data processing means by said second data processing means, the terminal comprises third means for authentication of said second data processing means by said first data processing means, the terminal comprises a first communication channel between said first data processing means and said second data processing means and first means for securing said first communication channel, the terminal comprises fourth means for authentication of said terminal module by said user, independently of said card, said fourth authentication means comprise means for calculation by said first data processing means and for presentation to said user via said second interface means of a password known to said user and computed on the basis of a first secret parameter stored in said first data processing means, the terminal comprises fifth means for conjoint authentication of said terminal module and said card by said user, and said fifth authentication means comprise means for computation by said device for executing said filter program and for presentation to said user via said second interface means of a password known to said use and computed on the basis of at least second and third secret parameters stored respectively in said first data processing means and said second data processing means.

In a first embodiment of the invention the terminal module is a personal computer and said programmable memory is the hard disk of said computer, said filter software is executed on the personal computer, or in a second mode of execution said programmable memory is on a secure server connected to the personal computer, the part of the filter software to be protected being executed on said secure server.

In a second embodiment of the invention the terminal module is a device such as a dedicated integrated circuit card reader, in which case said personal security device is an integrated circuit card or a personal computer. This embodiment differs from the preceding one in that said programmable memory is integrated into a secure microprocessor, said filter software being executed in said secure microprocessor. The dedicated terminal module can be portable.

Depending on the mode of execution of this second embodiment of the invention, the programmable memory for loading and storing the filter software can be in the personal security device or in the terminal module. In the latter case the terminal module can include a single microprocessor for executing the filter software and for controlling the interfaces or two microprocessors respectively implementing these two functions.

BRIEF DESCRIPTION OF THE DRAWINGS

Various embodiments of the invention will now be described with reference to the accompanying drawings, in particular embodiments in which the filter software is loaded and executed in the terminal to guarantee its source, its confidentiality and its integrity, the software being also able to authenticate the source of requests sent to it if confidence in the interfaces with the user, i.e. the screen and the keyboard, cannot be guaranteed.

FIG. 1 is a diagram showing the functional architecture of a system for carrying out secure transactions by means of a terminal in accordance with the invention;

FIG. 2A shows a first embodiment of the invention in which the terminal is a personal computer connected to an integrated circuit card by a reader, the application being installed on the personal computer or on a remote server;

FIG. 2B explains the functional architecture of one variant of the first embodiment of the invention in which the personal computer serving as a terminal is connected to a security server on which the filter software is installed;

FIG. 3 shows a transaction system using a terminal constituting a second embodiment of the invention, which can be a dedicated product connected as a peripheral device to a personal computer or directly to a server or based on a personal computer;

FIG. 4B is a functional diagram illustrating a first software architecture configuration of the terminal from FIG. 4A;

FIG. 4C is a functional diagram similar to that of FIG. 4B showing a second software architecture configuration of the terminal from FIG. 4A;

DETAILED DESCRIPTION OF THE INVENTION

Figure 4A:
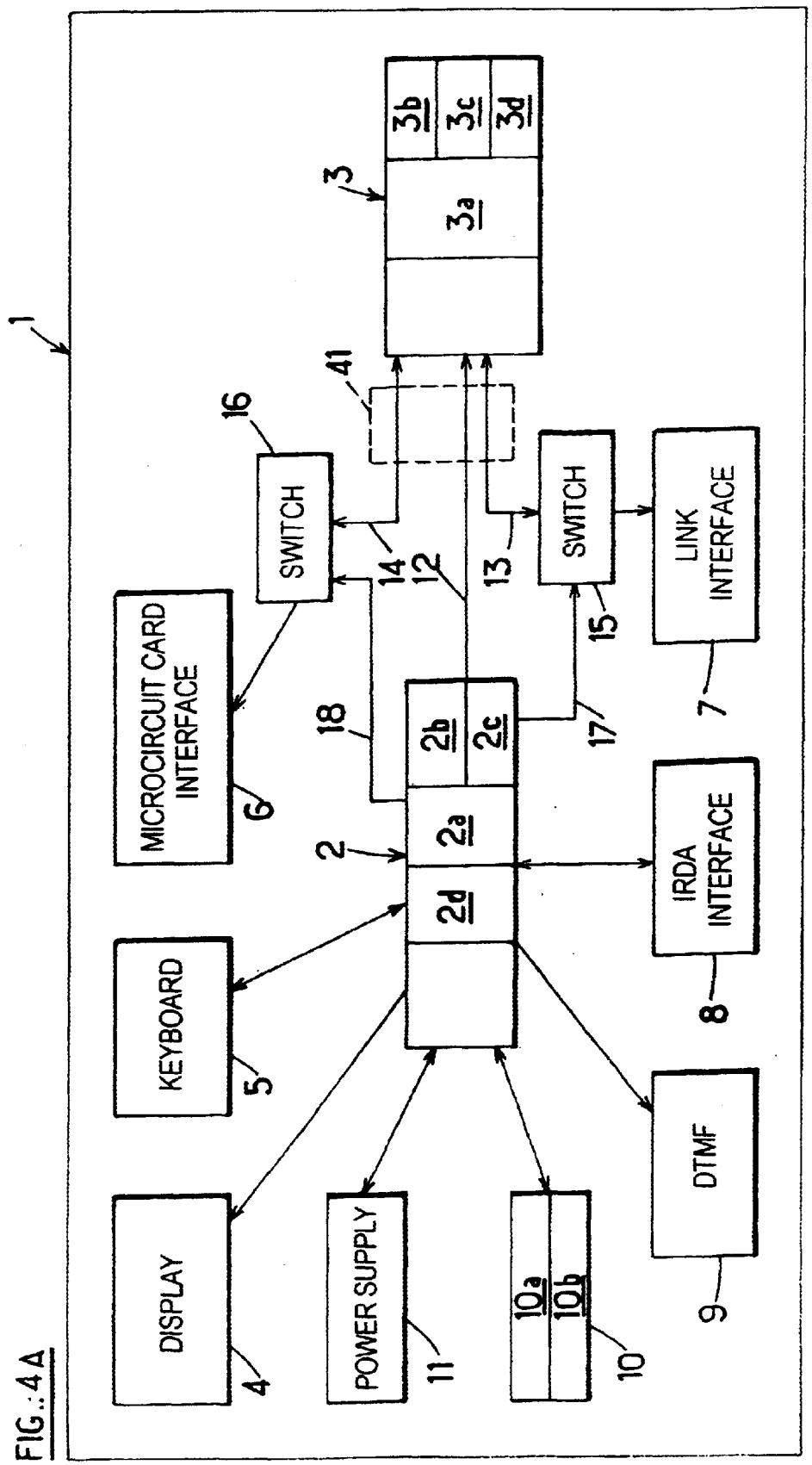
FIG. 4A is a block diagram of the hardware architecture of the electronic circuits of a first mode of execution of the terminal from FIG. 3.

Referring to FIG. 1, a system for carrying out secure transactions comprises a terminal module 1 for reading an integrated circuit card 31 or the like. The terminal module 1 comprises a filter F consisting of a software module processing high-level requests issued by application service providers FAp external to the terminal module 1 by means of a logic interface F-API and user interfaces such as a display screen 4 and a keyboard 5 enabling a user to read and enter data. It also comprises a reader or other communication interface 6 with a microcircuit card or any equivalent security device personal to the user of the token, "Java Ring" (from SUN), "iButton" (from Dallas Semiconductor Corporation), or soft token type and communication interfaces with at least one application service provider FAp which can be installed on a PC and/or on a server Sap, for example, data then being exchanged via a data communication or telecommunication network R.

The terminal module 1 can be a dedicated terminal or integrated into a PC or into a network computer (NC) dedicated to network applications or into a cable TV network decoder (Set Top Box).

The terminal module 1 can perhaps be used in autonomous mode, for example to read information such as the contents of an electronic purse contained in a memory of the card 31.

To carry out secure transactions the terminal module 1 can be used on-line to a server Sap or off-line, the application FAp then running locally, for example on the PC: this is the case when, for example, a user must sign an electronic mail message or transactions that will be sent to an addressee. An operation of this kind does not imply connection to an application server at the time when the card 31 is used.

In on-line mode, as represented in FIG. 3 in the case of a dedicated terminal module 1, the latter can be connected to the server Sap on which the application FAp is installed via the PC and a network R such as the Internet or through the intermediary of the telephone network R via a modem MO or a DTMF link with a telephone handset CT. Some transactions, such as reloading an electronic purse in the card 31, can necessitate bidirectional exchange of data with the server Sap and are therefore more ergonomic in on-line mode.

Carrying out a transaction secured with a terminal module 1 and a card 31 implies that high-level software requests (for example: requests for signature, authentication, etc which must be processed so as to meet the required security objectives of the application program) will be sent from the application program installed on the server Sap for example (on-line mode) or in the PC or NC available to the user (off-line mode, for example signing of electronic mail) to the filter F controlling the security means. The filter F processes these requests by means of translation software to assure-that the application or virus type software cannot have direct access to the cryptographic functions of the integrated circuit card 31. The processing of the high-level requests includes translation of these requests into one or more elementary commands which are executed by the personal security device. The high-level requests are formulated independently of the software and/or hardware design of the personal security device, i.e. they are not formulated as a direct function of the personal security device. The high level requests contain information specifically related to the process that will be executed by the filter F. In a simple example, a high level request can contain a single elementary command to be transferred to the personal security device, for example, an APDU (Application Protocol Data Unit) in the case of a smart card, attached to a Message Authentication Code that will enable the filter F to check the origin and integrity of this request before sending the elementary command to the personal security device. In a more complex example such as a request to sign a document, the high level request will be transformed by the filter F into a sequence of elementary commands sent to the personal security device and eventually to the user interface. Thus, according to this definition and due to the fact that it contains specific information to be decoded by the filter F independently of the personal security device, the high-level requests will be said to be independent of the personal security device.

The filter F meets the security objectives required in that the translation software that it includes verifies the identity of the application issuing the service requests (or the source of requests directly) and is installed in a manner that guarantees the integrity and. the confidentiality of the operations and data used to respond to service requests.

Translation software is configured for one type of microcircuit card and translates a high-level request received from application software into one sequence or a plurality of sequences of elementary commands that can be executed by the microcircuit cards and/or a sequence of exchanges of data with the user.

The high-level requests are a list of commands used by the application programs to invoke the security services needed to identify and authenticate the person performing the transaction and to guarantee the source, the integrity and where applicable non-repudiation of the transaction. A high-level request from an application (on a server or on the PC or NC) can be characterised by one or more of the following points:

- it is independent of the basic means (cryptographic means, for example) used to respond to its request and contains specific information to be processed by the filter F. Reciprocally, a plurality of applications can use the same security service provider, employing the same logic interface F-API defining these requests.
- the processing of the request links the transaction in a certain manner to the user performing the transaction by means of at least one fixed or variable secret parameter stored in the integrated circuit card of the user.
- it can include information enabling the filter software F to verify its source and its integrity. Authentication can use a Message Authentication Code (MAC) or a code of the electronic signature type associated with the request.
- if the transaction is not entered by the user on the terminal module itself, the request can contain the information needed for the user to verify the essential data of the transaction, if required and if the terminal module supports this option.

The logic interface F-API for exchanging high-level security requests between the application and the translation software of the filter F can be standardised so that it is common to different application programs. Accordingly, the signature type request can be used by an electronic mail application and by purchasing software. It is therefore possible to change the application whilst retaining the security service provider or vice versa to replace the security service provider without changing the application.

To guarantee the integrity of the chain of confidence between the application and the card, the translation filter software F identifies and even authenticates the source and the integrity of requests that it receives. Various methods are feasible for identifying the application issuing the requests:

- an identification code can be integrated into the request itself and then verified by the filter software using information that it contains or that can be stored on the integrated circuit card;
- the same objective can be achieved by comparing the result of a hashing operation executed by the filter software on the application software issuing the request with a result previously stored on the card, for example. This solution is particularly suitable for the situation in which the application is installed on the user's PC;
- authentication can equally be performed by associating with the request a MAC calculated from the content of the request and a secret key shared between the application and the filter software. An equivalent principle can be used with a signature on the request calculated with the same information and a private key known to the application, the signature being verified with the corresponding public key known to the filter software.

FIG. 2A explains a first embodiment in which the terminal module 1 is a PC 102, the connection to the integrated circuit card 31 employing a reader 6 connected to or integrated into the PC 102. The PC 102 includes input/output interfaces 102a to the reader 6 and the server Sap. Depending on the nature of the reader connected to the PC, the user interface components can be the keyboard and the screen of the PC itself or a keyboard and/or an LCD display on the reader, for example. In this embodiment the filter F is installed and executes on the PC 102. The filter F, and therefore the translation software that it contains, can be stored on the hard disk (HD) 102b of the personal computer 102. To execute on the central processor unit or microprocessor 102c of the PC, the filter software is loaded into the random access memory (RAM) 102d of the personal computer 102.

Because the hard disk of a PC is difficult to protect, the filter software F or at least the sensitive part of this software can be encrypted. For this purpose it can be divided into at least two modules: a loading/decrypting module Fcd and a second module corresponding to the encrypted filter software itself. The first module enables the second module to be loaded into RAM, decrypted and then executed. Referring to FIG. 2A, the software module when decrypted and loaded into RAM is denoted Fdec.

Programming languages like Java, with security mechanisms intrinsic to the language itself, strengthen the protection of the software.

Another method of verifying the integrity of the filter software is to have the second module signed by an authority guaranteeing the content of the filter software by means of a private key that is kept secret by the authority. The first loading module then, at the same time as performing the decrypting operation, performs a hashing operation on the second module and verifies the signature of this module using the public key associated with the private key of the authority.

The operations described above imply the use of keys on which the security of the application relies. These keys can be concealed in the loading module, stored in the reader 6, or stored on the integrated circuit card 31 itself. Another possibility is to install the decryption and integrity verification module in the reader 6.

The object of the invention is to prevent a pirate from using the integrated circuit card of a user without their knowledge, for example by modifying the filter software controlling the card or the application software, or by loading a virus to bypass the application or the filter software. The embodiment described previously and its variants address these risks, by enabling verification of:

- the integrity of the filter software, and
- the source and the integrity of commands sent to the card via the reader 6, by authenticating them using a MAC, for example. The MAC can be verified by the reader 6 or the card 31. Equivalent protection could be obtained by encrypting the dialogue between the filter software and the reader 6. A virus attempting to bypass the filter software would then send unauthenticated or incorrectly encrypted commands to the reader 6 or to the card 31; these commands would therefore be rejected by the reader or the card, preventing the virus from achieving its aims. To prevent a hacker from determining the keys used by a terminal by analysing the operation of another terminal, the keys used by various terminals must be diversified.

The encryption and signature mechanisms that can be considered to address the need to protect the filter software are well known to the skilled person and are based on existing cryptographic techniques as described, for example, in "Applied Cryptography, Protocols, Algorithms, and Source Code in C" by Bruce Schneier, John Wiley and Sons, Inc., 1994 (the entirety of which is incorporated by reference herein) and for this reason will not be described in detail here.

Installing the filter software on a PC cannot guarantee the same level of security as installing it in a dedicated terminal that can offer additional hardware security mechanisms as used in the other embodiments described later, these mechanisms offering physical protection of the filter software and the secrets that it contains.

FIG. 2B shows one variant of the FIG. 2A embodiment. This variant exploits the flexibility and the ease of connection of a personal computer to a network. This enables part of the filter software, and in particular the secrets, to be held by a secure server Ssec.

In FIG. 2B the filter software is divided into two software modules, a module F-PC installed on the PC 102 and a module F-SE installed on a security server Ssec. The programmable memory previously referred to and storing the filter software is therefore in the secure sever Ssec in this variant, i.e. out of reach of unauthorised users. Likewise, the filter software or at least the sensitive part of the filter software F-SE requiring protection executes on the secure server Ssec.

The software module F-PC installed on the PC 102 is connected by a secure channel CS to the security server Ssec. The secure channel is an encrypted communication channel for exchanging protected data between the two filter software modules F-PC and F-SE and possibly reciprocal authentication of the two modules F-PC and F-SE. The secure channel can use well-known communication protocols such as SSL, for example.

Setting up this secure channel CS therefore enables the first filter software module F-PC to send to the second filter software module F-SE requests received from the application FAp via the logic interface F-API together with information concerning identification of the application issuing these requests. After verifying the information relating to the application, and depending on the application and possibly on rights of the user, the second software module F-SE then translates these requests into a series of commands to the microchip card 31 and for controlling exchanges of data with the user. The commands generated by the module F-SE are then sent to the first module F-PC which routes them to the element concerned: the PC itself in the case of the commands controlling exchanges with the user or the integrated circuit card. For the commands controlling exchanges with the user to execute on the PC, the latter must include an interpreter software module 1. The interpreter software enables display of messages on the screen 4 and input of information by the user via the keyboard 5. The interpreter software module is described in more detail in connection with FIGS. 4B and 4C.

This second mode of execution is based on the mechanisms described a propos the first mode of execution (FIG. 2A) insofar as the identification of the application (hashing or signature, for example) and protection of commands sent to the card (addition of a MAC, for example) are concerned. On the other hand, it offers an enhanced degree of security insofar as the filter software module F-SE translating high-level requests received from the application FAp executes in a secure environment. In the context of the invention the server Ssec is deemed to be secure if it is not accessible physically or logically (i.e. via a network connection) to unauthorised persons.

The second mode of execution shown in FIG. 2B is suitable for applications employed in a closed or private environment controlled by a central authority, as it necessitates a protected server administered centrally. This second mode of execution also offers the facility to define a centralised policy of access to cryptographic services offered by the integrated circuit card. This access policy can be based on applications requiring the services of the card and on the users themselves. In the case of a business issuing its employees or customers integrated circuit cards enabling them to sign electronic mail and banking transactions, it can assure that only authorised users can sign: this mechanism can be implemented using the secure channel CS. For each signature request issued by one of the applications deemed to be valid by the business (the electronic mail program and the bank transaction software), the software module F-SE will execute a request for authentication of the user. This request can be executed, for example, by sending a random number (challenge) to the card 31 via the secure channel CS. After the user enters their confidential code, the integrated circuit card calculates a dynamic password by encrypting the challenge using a secret key that it holds. The password is then sent via the secure channel CS to the software module FSE. Knowing the user and therefore the secret key held on their card, the software module F-SE compares the password received with the password expected. This mechanism, known as challenge-response mode authentication, enables the software module F-SE to validate the user's identity. Thus the business that has issued the integrated circuit cards to the users can assure that only users who are still authorised can sign bank transactions, for example.

By virtue of the secure and centralised means that it represents, the server Ssec enables not only secure installation of the filter software F-SE but also the facility of instituting a centralised policy for controlling use of security services offered by the integrated circuit card. The server Ssec enables a centralised policy to be instituted by virtue of the fact that the same server can be connected to a plurality of software modules F-PC installed on the personal computers of a plurality of users. Thus the server Ssec enables centralised definition and control of the conditions of use of security services offered by the cards issued to the various users in accordance with the profile of the application requesting the services and the rights of said users. Instituting this centralised policy implies the server holding the necessary information, i.e. the rights of users to use a particular security service in connection with a particular application.

This second mode of execution (FIG. 2B), well suited to private environments, is difficult to apply to open applications where a secure central server Ssec is not feasible.

FIG. 3 shows a terminal module embodying functional architecture principles similar to those of FIG. 2B in a different embodiment requiring no centralised server. The terminal module in the second embodiment of FIG. 3 has a very high level of security, enabling it to assure local protection of the filter software F directly.

In FIG. 3 one face of the terminal module 1 which can be a portable unit, carries the display screen 4 and the keyboard 5 and the unit contains the electronic circuits, which are preferably not accessible from the outside. The module 1 contains the reader 6 and has an opening for inserting the microcircuit card 31 into the reader 6. The mode of execution described with reference to FIGS. 3, 4A, 4B and 4C must not be considered as limited to a dedicated terminal. The following description applies to a PC-based or NC-based terminal.

In a first mode of execution, shown in FIG. 4A, of this second embodiment of the terminal module of FIG. 3, the electronic circuits of the terminal module 1 are based on a standard micro controller 2 and a secure microprocessor 3 which are interconnected and permanently installed in the module 1. As an alternative to this, the microprocessor 3 can plug into the module 1 by means of a connector 41 shown in dashed line in FIG. 4A. This description covers a generic mode of execution based on a standard micro controller. In a particular mode of execution that will be described later, the micro controller 2 can be a PC 102 of the type shown in FIG. 2B.

The standard micro controller 2 comprises a processor unit 2a, temporary memory (RAM) 2b and permanent memory (ROM) 2c. It is preferably a "monochip" microprocessor the software of which is mask-programmed in the permanent memory 2c and which integrates into the same integrated circuit standard interface management or control means, the processor unit 2a, the temporary memory 2b and the permanent memory 2c.

The interfaces or peripheral devices managed by the micro controller 2 include the data display screen 4, for example a liquid crystal display, the keyboard 5 for entry of data by a user, the microcircuit card reader 6, an external connection interface 7, for example of the RS 232 or PCM-CIA type, an infrared link interface 8 and a DTMF device 9 for sending data over a telephone line.

The components of the module 1 also include a clock 10 and an electrical power supply 11 for the various circuits and components of the module 1. The electrical power supply 11 can be a battery power supply if the module 1 is portable and autonomous.

The task of the standard micro controller 2 is to manage the environment, i.e. to control the interfaces 4–9 and the clock 10 together with the power supply 11 for selectively energising the secure microprocessor 3 in the case of an autonomous module 1.

The standard micro controller 2 therefore requires little computing power, little temporary memory (RAM) and no semi-permanent memory (EPROM OR EEPROM). The micro controller 2 is write protected by virtue of the fact that programs (interface control and, as described below, interpretation, management of clocks and electrical power supply, etc) are mask-programmed in the permanent memory 2c. As will become apparent hereinafter, the standard micro controller 2 can also contain one or more secret parameters on the basis of which it can be authenticated by the secure microprocessor of the terminal module and/or of an integrated circuit card. The secrets must therefore be protected against reading and writing. They are preferably stored in the temporary memory (RAM) of a "monochip" microprocessor which cannot be written or read from the outside. The standard micro controller 2 can also have additional security functions, for example to prevent fraud such as display of data different to that coming from the microprocessor 3.

It is therefore of low cost and consumes little electrical power, which is particularly suitable for a portable product. The micro controller can be an OKI MSM 63180, for example.

There are preferably two clocks 10: a low-frequency clock 10a, for example a 32.368 kHz clock, and a high-frequency clock 10b, for example a clock at 1 MHz to 12 MHz. The micro controller 2 commands the connection of its system clock to one or other of these two clocks.

The slow clock 10a times a timer 2d of the micro controller 2 with a period of 0.5 s to provide a real time clock in the module 1. The processor unit 2a can also use the slow clock 10a for functions that do not require high calculation speed: in this case the system clock of the micro controller 2 is connected to the slow clock 10a and the fast clock 10b is stopped. This mode of operation reduces the electrical power consumption of the module 1 which is advantageous if it is portable and battery powered.

The microprocessor 3 which is read and write protected includes a central processor unit 3a, a temporary memory (RAM) 3b and a permanent memory (ROM) 3c, together. with electrically reprogrammable semi-permanent memory (EEPROM or Flash RAM, for example) 3d for storing the application programs of the module 1.

The secure microprocessor 3 is of the type used in microcircuit cards and has a limited number of inputs and outputs, its internal buses being inaccessible from the outside. It is manufactured with other security mechanisms specific to this type of microprocessor and well known to the skilled person, such as security matrix, memory scrambling, clock frequency control, reset control, etc mechanisms.

Because the microprocessor 3 has a semi-permanent memory 3d it is possible to load one or more application programs into it from the outside, for example from a server or from a microcircuit card. It is therefore possible to modify the application(s) in accordance with requirements (access control, financial and/or commercial transactions, electronic purse, etc) for which the module 1 is intended. If the size of the semi-permanent memory 3d allows it, it is also possible to install new applications during its use.

Depending on the version chosen, the secure microprocessor 3 can compute cryptographic functions requiring large-scale computations embodied in RSA or DSA type asymmetric algorithms or use simpler algorithms, for example DES type algorithms.

The secure microprocessor 3 can be, for example:
  a SIEMENS SLE44C160S non-cryptographic microprocessor, with 14 kbytes of ROM and 16 kbytes of EEPROM;
  an SGS THOMSON ST16CF54A cryptographic microprocessor, with 16 kbytes of ROM, 4 kbytes of EEPROM and 480 bytes of RAM;
  a PHILIPS P83C858 cryptographic microprocessor with 20 kbytes of ROM and 8 kbytes of EEPROM.

The secure microprocessor 3 is connected by the link 12 to the standard micro controller 2 and by links 13 and 14 to the external interface 7 and to the microcircuit card reader 6 via respective switches-interface adapters 15 and 16. The switchesinterface adapters 15 and 16 are controlled by the standard micro controller 2 via respective links 17 and 18.

The standard micro controller 2 comprises an interpreter program 20 (FIGS. 4B and 4C) stored in the ROM 2c and enabling it to execute commands generated by the software for translating high-level requests forming part of the application or program(s), as described hereinafter. The interpreter 20 enables application programs stored in the secure microprocessor 3 to control the interfaces 4–9 via the link 12. The application programs can nevertheless be located and executed elsewhere than in the secure microprocessor 3, for example on a microcircuit card 31 inserted into the interface 6, for example a card supporting mechanisms for downloading and executing applications as described in French Standard NF EN 726-3, the title of which translates as "Integrated circuit cards and terminals for telecommunications. Part 3: Specifications of the card independent of the applications".

Depending on the security rules to which they are subject, the application programs can also be divided between these various locations.

FIG. 4B is a functional diagram showing a first software architecture configuration of the module 1 from FIG. 4A in which all application programs A1, A2, ..., An and security functions (condensate computations, symmetrical cryptographic algorithms such as DES or triple DES, asymmetric cryptographic algorithms as proposed by RSA) are implemented in the secure microprocessor 3.

Figure 8:
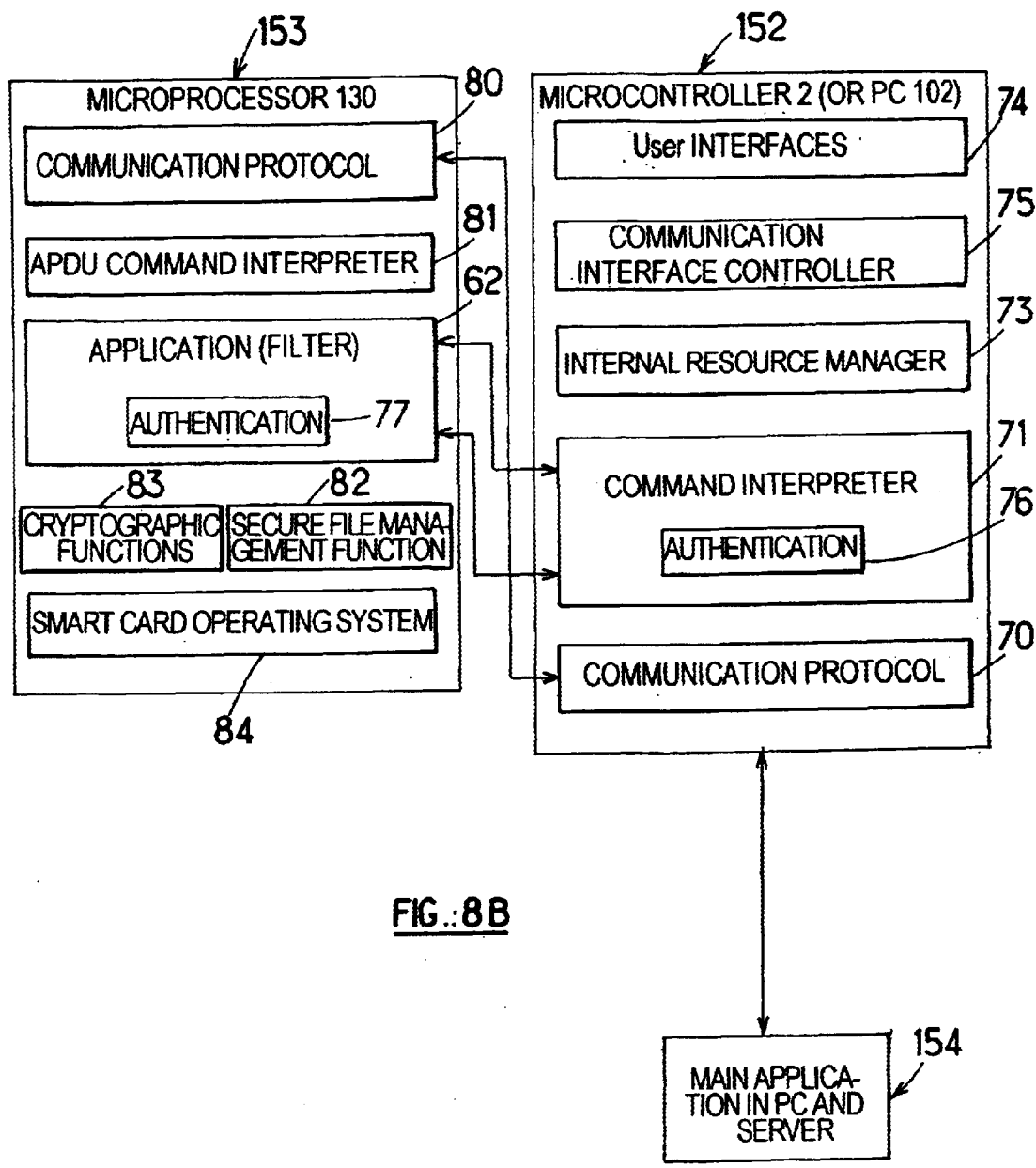
FIG. 8A is a diagram illustrating the software architecture of a transaction system comprising the terminal from FIG. 4A.
FIG. 8B is a diagram illustrating the software architecture of a transaction system comprising the terminal from FIG. 6.

The applications denoted A1, A2, ..., An hereinabove and in the remainder of the description comprise at least the filters F1, F2, ..., Fn and thus in particular the software for translating requests from the application service provider(s) FAp forming part of the main application 54 (FIG. 8A).

The standard micro controller 2 manages the environment using various interface drivers:
  a driver 21 for the microcircuit card reader or interface 6;
  a driver 22 for the serial link interface 7;
  a driver 23 for the keyboard 5;
  a driver 24 for the infrared link interface 8;
  a driver 25 for the display 4;
  a driver 26 for the clock 10 and the power supply 11;
  a driver 27 for the DTMF interface 9; and
  a driver 28 for other interfaces, assuming that the module 1 includes one or more interfaces other than those represented in FIG. 2.

The secure microprocessor 3 can therefore control the interfaces by means of commands which are interpreted by the interpreter 20 and executed by the standard micro controller 2 using the drivers 21–28.

FIG. 4C shows a second software configuration of the module 1 from FIG. 4A in which one:or more applications Ax and one or more cryptographic functions Sx are stored in a reprogrammable memory 30a of a secure microprocessor 30 of a microprocessor card 31. When the card 31 is inserted into the reader 6, the microprocessor 30 executes the applications Ax and the cryptographic functions Sx. Other applications and security functions can be resident in and executed by the secure microprocessor 3 of the module 1 For example, the microprocessor 30 of the card 31 can assure an electronic signature function assuming that the secure microprocessor 3 does not include a dedicated computation processor (cryptoprocessor). Reciprocally, if the secure microprocessor 3 includes a cryptoprocessor, it is possible for an application on the microcircuit card 31 to invoke cryptographic commands of the module 1 that will be executed by the secure microprocessor 3.

In this second configuration, which otherwise is identical to that of FIG. 4B, the interpreter 20 has the same role relative to the microprocessor 30 as it has relative to the secure microprocessor 3. Thus the module 1 can execute different applications according to the type of microcircuit card 31 inserted into the reader 6, for example:

- authentication of the user in the context of a banking transaction (balance enquiry, transfer of funds, etc) effected via a telephone line by means of the DTMF interface 9;
- electronic purse balance enquiry or reloading from the module 1 when a microcircuit card 31 used as a purse is inserted into the reader 6. The module 1 offers the facility to manage several different purses: bank purse, purse specific to an institution, for example;
- reading a medical dossier on a medical card;
- reading loyalty points on a card on which loyalty points are awarded to a consumer according to purchases made, participation in customer loyalty operation, etc.

The mode of execution described hereinabove with reference to FIG. 4A and the software configurations shown in FIGS. 4B and 4C likewise apply to a terminal based on a conventional PC additionally equipped with a secure microprocessor 3. In this mode of execution the micro controller 2 corresponds to the PC 102 as shown in FIG. 2A, the processor unit 2a corresponds to the microprocessor 102c of the PC and the RAM 2b and the permanent memory 2c respectively correspond to the RAM 102d and the hard disk 102b. Likewise the inputs/outputs 102a of the PC correspond to the interface modules 7, 8 and 12 of FIG. 4A. The connection between the secure microprocessor 3 and the PC 102 can be a serial or parallel link or a connection to the PCMCIA type internal bus of the PC, or a direct connection to the PC motherboard. As an alternative to this, the secure microprocessor 3 can be fixedly or removably (via the connector 41) integrated with the PC keyboard.

In this case the interpreter software module 20 and the peripheral driver software modules 21 through 28 are installed on and executed on the PC. The functional architecture of this mode of execution is equivalent to that shown in FIG. 2B, the interpreter module 20 installed on the PC assuring the same role as the interpreter module 1 from FIG. 2B: it executes commands for controlling exchanges with the user received from the filter software F which is installed in a secure manner in the microprocessor 3 (FIG. 4B) or the integrated circuit card 30 (FIG. 4C).

Figure 5:
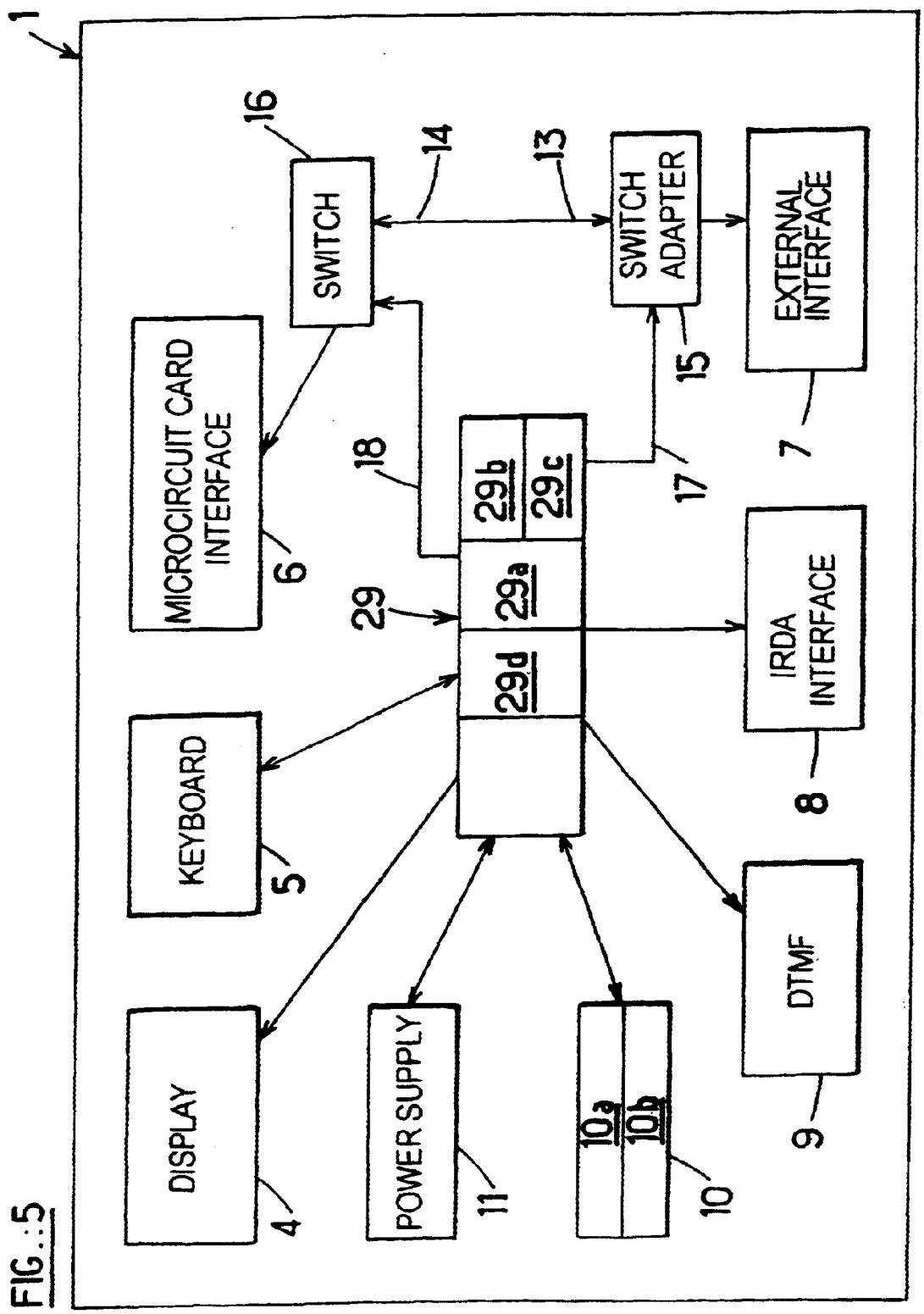
FIG. 5 is a block diagram of the hardware architecture of the electronic circuits of a second mode of execution of the autonomous terminal from FIG. 3.

The FIG. 5 diagram illustrates a second mode of execution of a second embodiment of the invention in which the electronic circuits of the terminal module 1 are based on a single micro controller 29 replacing the micro controller 2 and the microprocessor 3 and offering the same type of physical and logical protection as the microprocessors designed for integrated circuit cards. This micro controller drives all the interface means 4-9 of the terminal module. It includes a processor unit 29a, a temporary memory (RAM) 29b, a permanent memory (ROM) 29c and a semi-permanent memory (EEPROM) 29d for storing the translation software. The processor unit 29a corresponds to both the data processing unit 2a controlling the interfaces and the processor unit 3a for executing the translation software. As previously, the terminal module 1 can be based on a PC 102 to the internal bus of which is connected a secure micro controller 29 controlling the display screen 4 and the keyboard 5 of the PC directly.

In one variant the memory in which the software for translating high-level requests is stored, volatile RAM with backup power supply or semi-permanent memory (EEPROM or Flash RAM), can be external to the micro controller 29. In this case the translation software can be encrypted and signed or protected by a message authentication code (MAC) to assure its integrity and its confidentiality. The software is read by the micro controller 29, decrypted and then executed.

Figure 6:
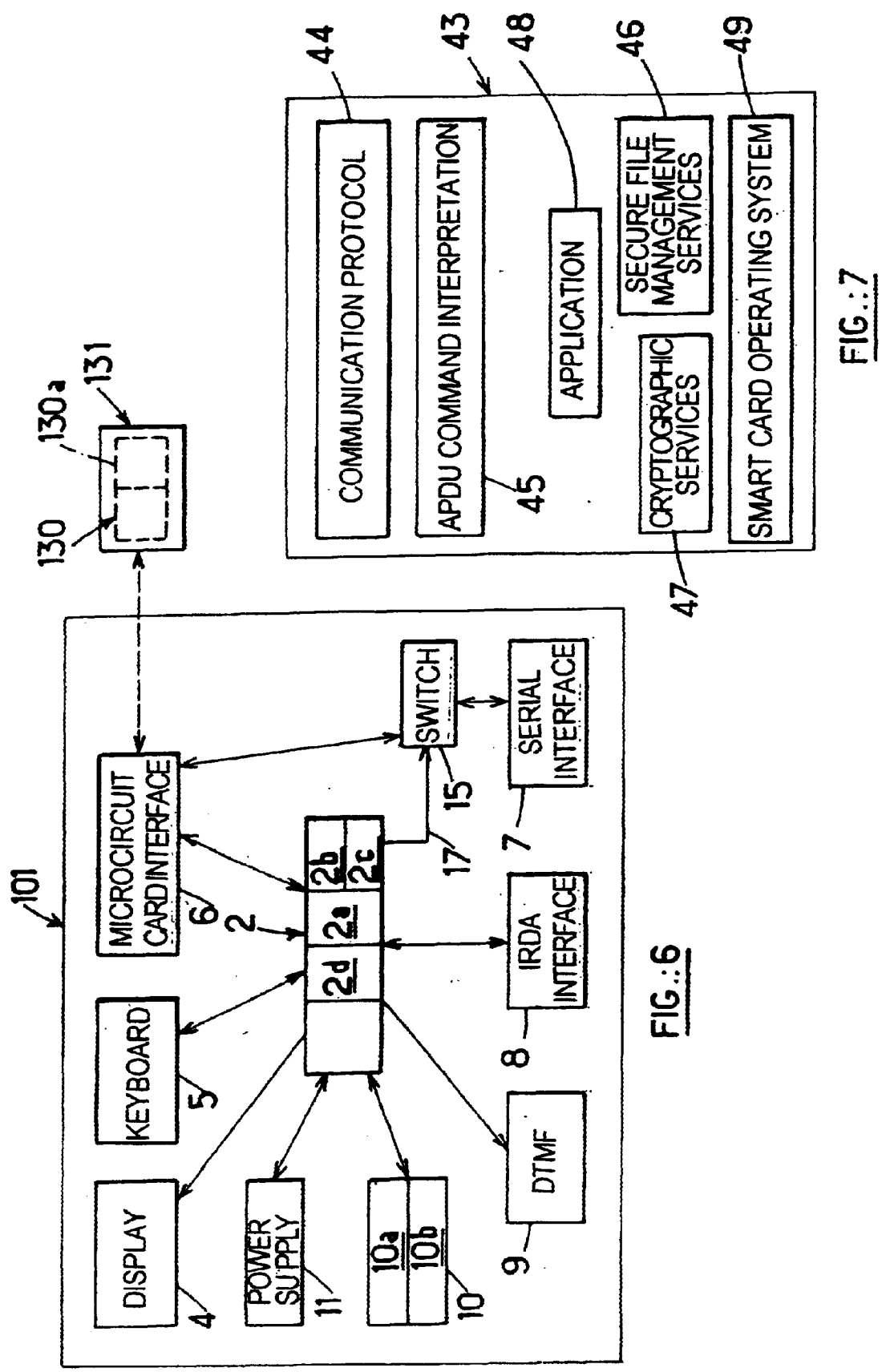
FIG. 6 is a block diagram of the hardware architecture of the electronic circuits of a third mode of execution of the autonomous terminal from FIG. 3.

In a third mode of execution represented in FIG. 6 of the second embodiment of the invention the terminal module 101 has no secure microprocessor 3. In FIG. 6 the same reference numbers as in FIG. 4A denote the same elements. The micro controller 2 controls the interface 6 and the switch-adapter 15 for connecting the secure microprocessor 130 of a programmable microcircuit card 131 in the interface 6 with the external link interface 7. In this case all of the applications A and the cryptographic functions C are stored in a semi-permanent memory (EEPROM or Flash RAM) 130a of the secure microprocessor 130 of the programmable microcircuit card 131 and implemented by the latter as described with reference to FIG. 4C in respect of the applications Ax and the cryptographic functions Cx.

In the examples described previously, for simplicity, the microprocessor 30, 130 of the integrated circuit card and the secure microprocessor 3 possibly incorporated in the terminal module have a single communication port. This implies that in these examples exchanges between the various entities, i.e. the electronic unit 154 (FIG. 8) containing the main application, the secure microprocessor 3 and the microprocessor 30, 130 of the integrated circuit card, are effected via the micro controller 2 or 29 of the terminal module. The above descriptions must not be considered as limiting on the invention: other implementations are feasible within the scope of the present invention. The secure microprocessors for integrated circuit cards currently available which can be used for the card itself (microprocessor 30, 130) or in the terminal module (microprocessor 3) can have two communication ports. Various embodiments optimising communication are therefore easy to envisage with this type of microprocessor. In FIG. 4C, for example, one port of the integrated circuit card 31 can be dedicated to controlling the user interface and therefore connected to the micro controller 2, the other port being connected to the electronic unit including the main application, subject to appropriate interface adaptation.

According to one important feature of the invention, filter software is stored in the reprogrammable memory EEPROM associated with the secure microprocessor 3 or 29 of the terminal module 1 and/or the secure microprocessor 30, 130 of the card 31, 131. This filter software translates in a manner known in itself high-level requests from the server Sap or from the PC into sequences of elementary commands that can be executed by these microprocessors (these commands are defined in part 4 of ISO standard 7816-4). In accordance with the invention, this filter software translates these high-level requests into sequences of exchanges of data between the terminal module 1, 101 and the user via the interface means such as the display 4 and the keyboard 5.

This solution has the advantage of considerably reducing the flow of data exchanged between the terminal module 1, 101 and the server Sap or the PC, but requires secure installation of the translation software to prevent instructions sent to the microcircuit card from being modified.

This filter software is an integral part of the portion of the application software installed in the terminal module 1 and/or the card 31, 131 and can therefore be downloaded.

Figure 7:
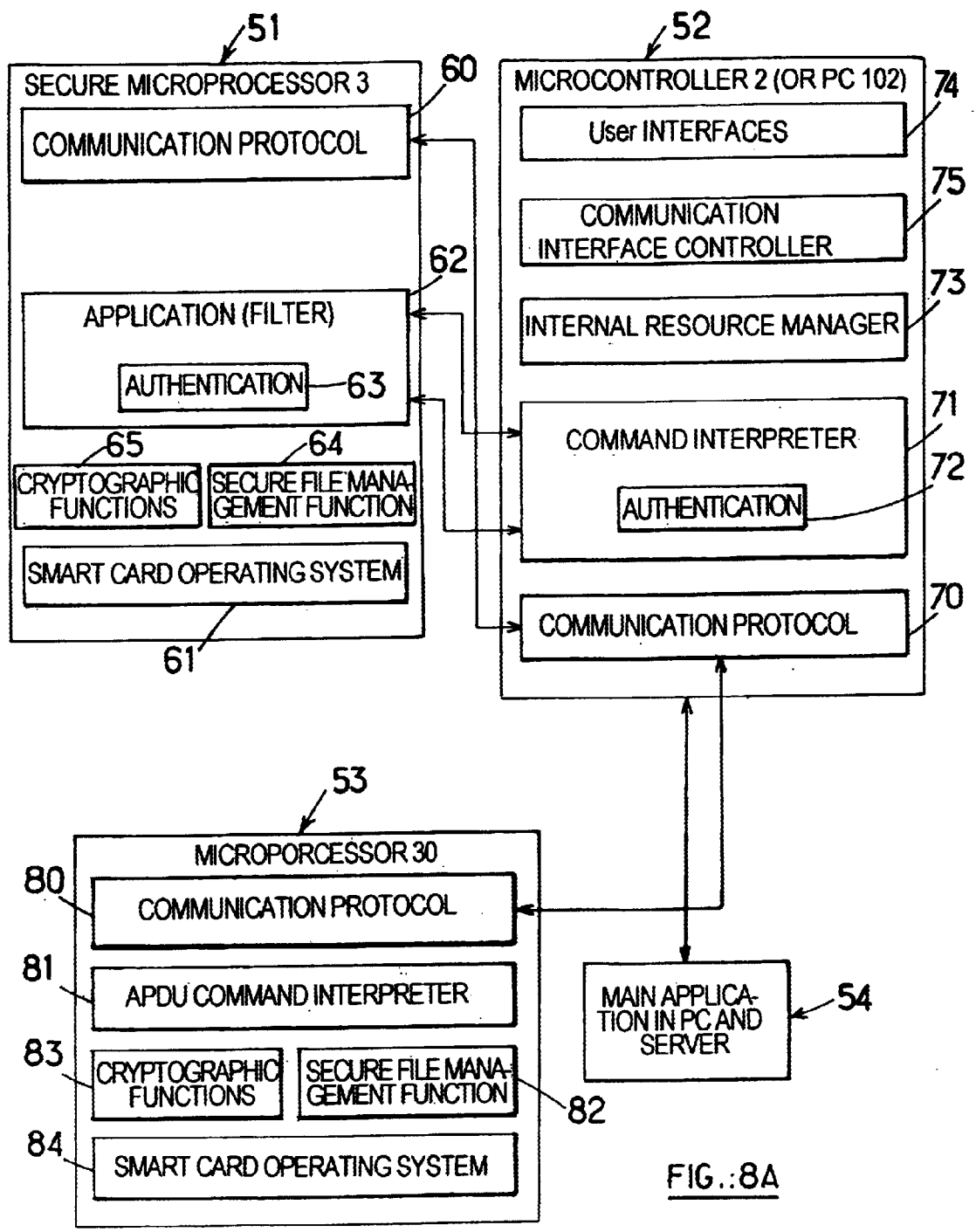
FIG. 7 is a diagram illustrating the conventional software architecture of a microcircuit card.

FIG. 7 illustrates the conventional software architecture of a microcircuit card (smart card).

The various software layers are represented by a block 43 which comprises a "communication protocol" software layer 44 enabling commands to be received. These commands are decoded by an "APDU command interpreter" software layer 45 (APDU: Application Protocol Data Unit) the role of which is to route the commands to the processing modules, which can be:

secure file management services software 46;

cryptographic services software 47;

application software 48.

The processing modules 46, 47, 48 rely on basic services offered by the operating system 49 of the microcircuit card.

FIG. 8A illustrates the software architecture of a system for carrying out secure transactions using terminal modules 1 provided with a secure microprocessor 3 in accordance with the mode of execution of the invention shown in FIG. 4A.

Block 51 represents the software executed by the secure microprocessor 3 of the terminal module 1, block 52 the software executed by the micro controller 2 or the PC 102 of the terminal module 1, block 53 the software executed by the microprocessor 30 of a microcircuit card 31 and block 54 the main application software (application service provider) installed on the server Sap or on a PC.

Block 51 is similar to block 43 of FIG. 7, i.e. the secure microprocessor 3 has an architecture similar to that of an integrated circuit card. Block 51 comprises:

communication protocol software 60;

operating system 61;

a block 62 representing the portion of the application software installed in the terminal module 1, this portion of the application software essentially comprising the filter software previously mentioned. Various software modules of this type corresponding to various applications can co-exist in the secure microprocessor 3;

optionally, software 63 for authentication of the standard micro controller 2 (by the secure microprocessor 3) and authentication of the secure microprocessor 3 of the terminal module 1 (by the microprocessor 30 of the card 31);

secure file management software 64;

cryptographic services software 65.

Block 52 comprises:

communication protocol software 70;

a command interpreter 71 corresponding to the software 20 from FIGS. 4B and 4C;

authentication software 72 for authentication of the standard micro controller 2 (by the secure microprocessor 3 of the terminal module 1) in conjunction with the software 63;

software 73 for controlling resources internal to the micro controller 2;

software 74 for controlling interfaces with the user drivers 23 and 25 for the screen 4 and the keyboard 5);

software 75 for controlling the communication interfaces 7, 8 and 9 (drivers 22, 24, 27).

Finally, block 53 is similar to block 43 but in the example described with reference to FIG. 8A does not include any application or filter software. It comprises:

communication protocol software 80;

APDU command interpretation software 81;

secure file management services (for example PIN checking) software 82;

cryptographic services software 83 (symmetrical cryptographic computations using secret keys or asymmetric cryptographic computations using public and private keys, etc) for authentication of the secure microprocessor 3 of the terminal 1 (by the microprocessor 30 of the card 31) in conjunction with the software 63, among other functions;

the operating system 84 of the microprocessor 30 on the card 31.

The communication protocol 60, 70, 80 controls exchange of data between:

the microprocessor 30 of the card 31 and the standard micro controller 2 of the PC 102 of the terminal module 1;

the secure microprocessor 3 and the micro controller 2 of the terminal module 1;

the secure microprocessor 3 of the terminal module 1 and the microprocessor 30 of the card 31.

FIG. 8B is a view similar to FIG. 8A illustrating the software architecture of the system in the situation where the terminal module 101 does not include the secure microprocessor 3, in accordance with the third mode of execution of the second embodiment of the invention (FIG. 6).

In FIG. 8B, block 152 represents the software executed by the micro controller 2 of the terminal module 101, block 153 the software executed by the microprocessor 130 of a programmable microcircuit card 131, and block 154 the main application software installed on the server Sap or on a PC.

Block 152 comprises the same software 70, 71 and 73 through 75 as block 52 from FIG. 8A and a block 76 which comprises software for authentication of the standard micro controller 2 of the terminal module 101 (by the microprocessor 130 on the card 131).

Block 153 relating to the microprocessor 130 of the card 131 comprises software 62 and 80 through 84 of blocks 51 and 53 from FIG. 8A together with software 77 for authentication of the standard micro controller 2 of the terminal module 101 (by the microprocessor 130 of the card 131) in conjunction with the software 76.

Unlike a conventional system, in a secured transaction system of the invention the filter software 62 which translates high-level requests from the application into elementary commands that can be executed by a microcircuit card is installed in the secure user environment, i.e. either in the terminal module 1 (for the applications A1, A2, . . . , An of the modes of execution from FIGS. 4A–4C and 5) or on a semi-permanent memory card 31, 131 which can be used with the terminal module 1, 101 (for the applications Ax of the FIG. 4C embodiment and for all the applications of the FIG. 6 embodiment).

Apart from its microcircuit card management function, the filter software 62 controls interaction with the user, i.e. the sequences of exchanges of data between a user and the terminal module which are required in the context of an application and which use the interface means, namely the screen 4 and the keyboard 5. Note that the invention is not limited to the use of a screen and a keyboard as interfaces with the user and that any other type of interface with the required ergonomic features could be suitable, for example a voice interface.

Transactions are secure because the filter software 62 is securely installed in the secure microprocessor 3 or 29 of the terminal module 1 or the microprocessor 30, 130 of the microcircuit card 31, 131. The keys and rules necessary to access files on the microcircuit card 31, 131 are contained in the translation software 62 and are therefore inaccessible to third parties.

The functions of the filter software 62 will be illustrated hereinafter in the context of an example of an electronic trading application. The application includes the following entities:

a purchaser, a merchant, a bank.

The merchant has an electronic trading server Sap (Web server) accessible via the Internet. The purchaser has:

a PC for accessing the electronic server Sap to consult a catalogue of products, an integrated circuit card 31 supplied by the bank and the microprocessor 30 in which contains a private key but does not have any cryptographic capabilities connected with a signature, a terminal module 1 as shown in the FIG. 4A embodiment, having a standard micro controller 2, a secure microprocessor 3 with cryptographic capabilities enabling a message to be signed, a keyboard 5, a display 4, an integrated circuit card interface 6 and a serial interface 7 for connecting it to a PC.

The principle of operation is as follows: the transaction is signed by the terminal module 1 using a private key held by the card 31. This private key is protected by a confidential code (PIN) that the purchaser must enter in a secure environment, i.e. on the terminal 1, and by prior authentication of the terminal 1 by the card 31 using a secret key Kauth. The private key is also transmitted in an encrypted manner (by means of a key Kchif) to set-up a secure communication channel between the microprocessor 30 of the integrated circuit card 31 and the secure microprocessor 3 of the terminal 1.

Figure 9:
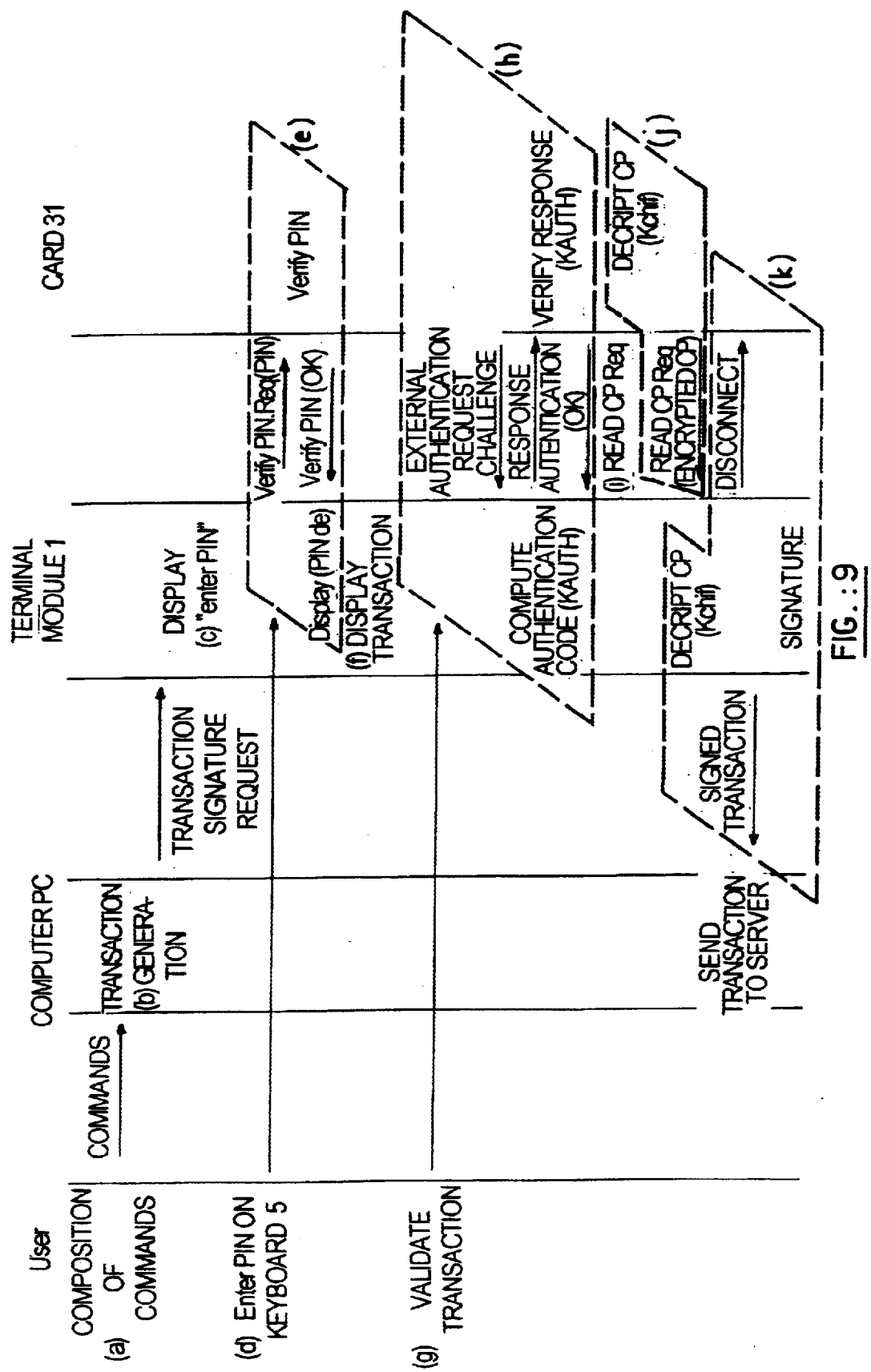
FIG. 9 is a diagram illustrating the implementation of an electronic trading application by means of a system in accordance with the invention.

FIG. 9 illustrates the exchanges between the various entities:

a. the purchaser enters an order on the PC, b. the PC generates the transaction to be signed by the purchaser (product code, price) and requests the terminal module 1 to sign the transaction, c. the terminal module verifies the source of the request for signature and then prompts the user to enter their PIN code by displaying a message "enter PIN" on the display 4, d. the purchaser enters the code (PIN) on the keyboard 5 of the terminal module 1, e. the terminal module 1 sends the PIN to the card 31 for verification; positive verification lifts one of two conditions of access to reading the private key, f. the terminal module 1 displays the transaction on its display 4, g. the purchaser confirms it by pressing a "confirm" key on the keyboard 5 of the terminal module 1, h. the terminal module 1 submits an external authentication request to the card 31. External authentication enables the secure microprocessor 3 of the terminal module 1 to authenticate itself to the microprocessor 30 of the card 31 and thereby lift the second level of protection of access to the private key. This authentication is performed in challenge/response mode using a secret Kauth shared by the terminal module 1 and the card 31, i. the terminal module 1 sends a private key read request to the card 31, j. all access conditions having been satisfied, the card 31 accepts the read request and sends the private key, which is encrypted using a secret key Kchif shared by the card 31 and the terminal module 1, k. the terminal module 1 decrypts the private key, signs the transaction by means of the private key, destroys the private key, disconnects from the card 31 and sends the signed transaction to the PC which sends it to the server S.

The above example can easily be transposed to an electronic transaction performed without any PC, the terminal module 1 being connected directly to a server Sap by a modem link (FIG. 3), the purchaser entering the order (product code) on the terminal module 1.

Note that authentication of the secure microprocessor 3 by the card can also be effected by way of the read private key command by associating with it a message authentication code (MAC) calculated using a secret key.

This example shows that the filter software 62 can translate a high-level "request for transaction signature" into a multitude of individual requests addressed to the various interfaces of the terminal interface 1, namely its interface 6 with the integrated circuit card 31, its interface with the display 4, its interface with the keyboard 5 and its interface for connecting it to the PC or the server Sap.

Translation filter software of this kind has a screening role, providing a filter between the outside world, i.e. the applications, and the peripheral devices that it controls.

It enhances security because:

1. It imposes a sequencing of the individual instructions sent. For example, in the situation illustrated hereinabove, it requires the transaction to be confirmed by the user before it is signed.

2. It alone has the secret parameters for generating and authenticating these individual instructions. Thus it alone has the authentication and encryption keys for reading and decrypting the private key.

When the filter software executes in the secure microprocessor 3 of the terminal module 1 these properties enable a policy of access to the card 31 to be imposed which is not always completely imposed by th card itself, or the capacities of a card to be expanded (signature capacity delegated to the terminal module, use in a context not foreseen when initially deployed).

The advantages in terms of security of executing the filter software in the secure microprocessor of the terminal module or the integrated circuit card are possible only because the software executes in a secure environment, assuring that:

the secrets contained in the filter software are not accessible because they are stored in the secure microprocessor 3, 29, 30 or 130, the confidentiality and the integrity of the filter software are preserved because the software is stored in the secure microprocessor 3, 29, 30 or 130.

If the terminal module 1 is a dedicated product having its own interfaces (display 4 and keyboard 5) the security objective is achieved because the software controlling exchanges of data with the user cannot be modified because it is permanently stored in the permanent memory 2c of the micro controller 2 or securely stored in the micro controller 29. Thus the user can confidently confirm the content of their transaction by means of the display 4 and the keyboard 5 and the need to verify the identity of the application or the source and the integrity of requests becomes optional.

Other mechanisms can further enhance the level of security of the chain of confidence between the secure microprocessor of the integrated circuit card, the secure microprocessor of the terminal module, when present, the standard micro controller or the PC of the terminal module and the user. These mechanisms are:

A) secure downloading of the filter software;

B) authentication of the standard micro controller by the secure microprocessor or (which amounts to the same thing but is more suitable in the case of a mode of execution of the terminal based on a PC) authentication of the interpreter software module I (20) by the filter software F (62) and/or setting up of a secure communication channel between these two microprocessors or the programs I and F;

C) protection of a secret by the standard micro controller;

D) mutual authentication and setting up of a secure communication channel between the secure microprocessor of the integrated circuit card and the secure microprocessor of the terminal module;

E) authentication of the terminal module and where applicable of the terminal module/card combination; and F) authentication of the microcircuit card by the terminal module.

A) Secure downloading of the filter software

Figure 10:
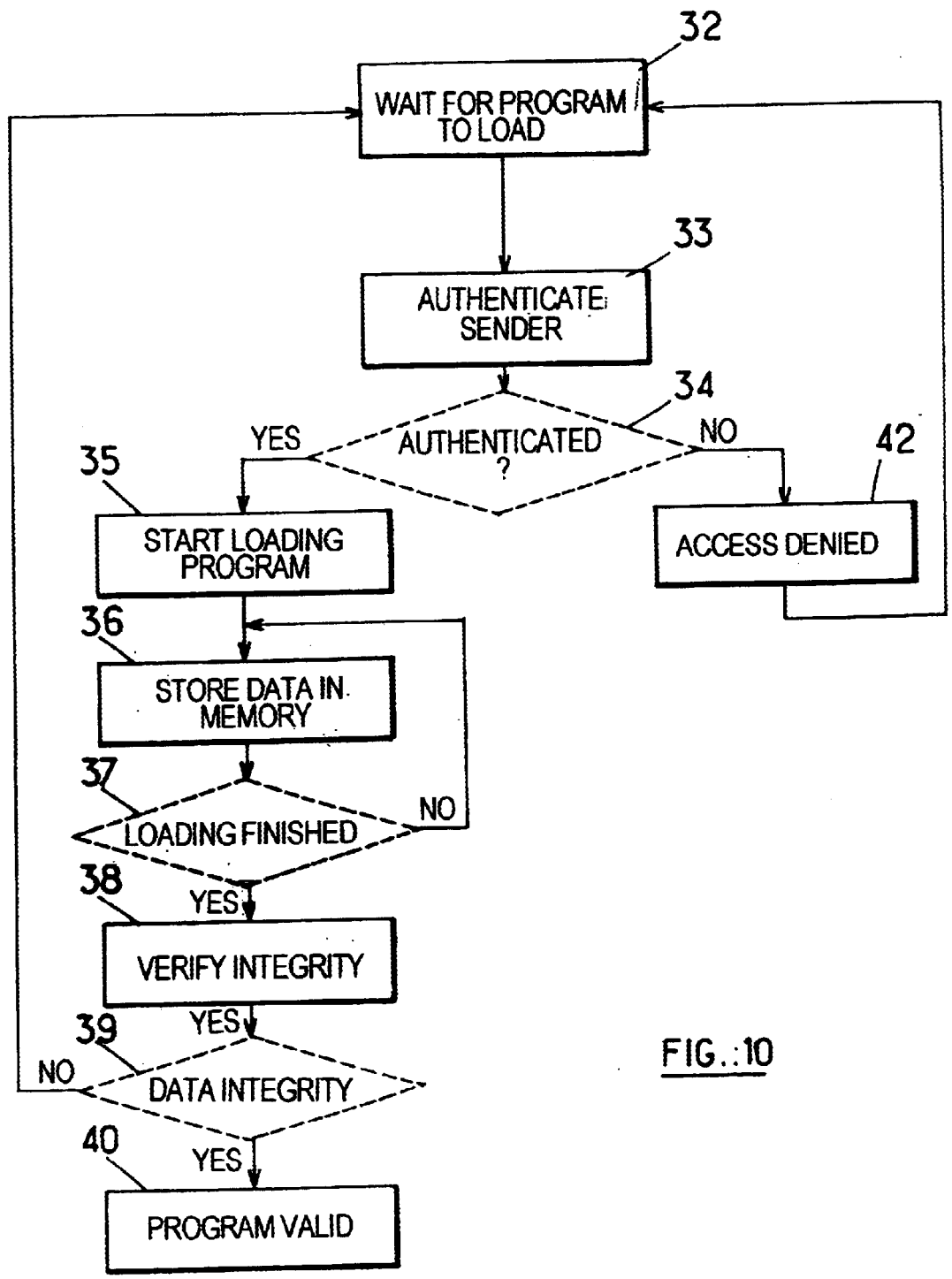
FIG. 10 is a flowchart showing the process of downloading a program into a reprogrammable memory of the terminal module from FIG. 4A or FIG. 5 or of a microcircuit card connected to the latter.

The FIG. 10 flowchart illustrates the process of downloading an application program (filter software) into the secure microprocessor 3 or 29 of the module 1 or the secure microprocessor 30, 130 of a card 31, 131 in the reader 6. This downloading can be effected from a server Sap via the PC and the external connection interface 7 or the infrared link interface 8, for example, or directly by means of a telephone connection via the DTMF interface 9. The downloading can equally be effected into the secure microprocessor 3 or 29 (if the terminal module has one) from a microcircuit card inserted into the reader 6.

In step 32 the area of the memory 3d allocated to the application program to be received is empty and the microprocessor 3 is waiting to load the application program following a loading request.

The next step 33 corresponds to a procedure for authentication by the microprocessor 3 of the entity that will download the application program (sender). This authentication procedure can use encryption mechanisms well known to the skilled person, for example, such as symmetrical mechanisms using shared secret keys or asymmetrical mechanisms using private and public keys.

Step 34 is a test to determine if the authentication procedure has succeeded. If it has not, the message "access refused" is displayed on the screen 4 (step 42) and the program returns to step 32; if authentication has succeeded, the process for loading the application program begins in step 35.

Step 36 corresponds to storage in the EEPROM 3d of the data frames sent by the entity responsible for downloading.

Step 37 is a test to determine if downloading has finished: if not, the downloading program returns to step 36 and downloading continues; if it has finished, the microprocessor 3 verifies the integrity of the received data in step 38. To this end a message authentication code (MAC) can be associated with the downloaded program for verifying not only its integrity but also its source. The MAC can be generated using a symmetrical cryptography mechanism (DES in chained CBC mode). The source and integrity can also be verified using an asymmetrical cryptography mechanism: a condensate of the downloaded software is signed by the sender using their private key; the secure microprocessor 3 then verifies the signature using the sender's public key.

Note that in this last example the public key in theory does not need to remain confidential. The security features of the microprocessor nevertheless assure the integrity of the software, preventing a hacker from modifying the software to eliminate the signature verification or simply to substitute for the public key initially provided a public key for which they know the associated private key.

If the test 39 indicates that the data received is correct, a flag indicating that the application program received is valid is generated in step 40. Otherwise the downloading program returns to the first step 32.

This process of loading the application software, and thus the filter software, into the secure reprogrammable memory (3d, 30a, 130a depending on the embodiment concerned) includes mechanisms for confirming the source and the integrity of the data received from the sender of the software. This prevents downloading by a hacker of filter software that could carry out transactions in the terminal module 1, 101 unknown to the user.

B) Authentication of the interpreter software module I, 20, 71 by the filter software F, 62 or, which amounts to the same thing in the corresponding mode of execution, authentication of the standard micro controller 2 by the secure microprocessor and/or setting up of a secure communication channel between the programs or between the microprocessors For a user to be totally confident in the terminal module they are using to carry out transactions it is necessary:

to authenticate the data sent from the interpreter software 20, 71 to the secure microprocessor 3, 30 or 130 executing the filter software; and to assure that the data sent by the filter software to be displayed through the intermediary of the user's interpreter software of the terminal module 1, 101 can only be displayed by the latter.

When the means of controlling exchange of data with the user, i.e. the interpreter software 20, 71, is installed in the terminal module 1, 101 in a fixed manner and cannot be modified, for example in the ROM 2c of the standard micro controller 2, authenticating the software module is equivalent to authenticating the micro controller.

Likewise, when the filter software is installed in secure processing means such as the secure microprocessor 3, the integrated circuit card or the secure server Ssec, in a manner such that it cannot be modified by an unauthorised person, authentication by these secure means is equivalent to authentication by the filter software itself.

In the following description the mechanisms for authentication of the software means controlling the interfaces or the interpreter software 20, 71 by the filter software will be described.

Various solutions verify these conditions.

A first solution consists in encrypting all the data exchanged between the interpreter software 20, 71 and the filter software.

A second solution is to have the interpreter software 20, 71 authenticated by the filter software and/or to set-up a secure communication channel between them.

These two solutions necessarily imply that at least one secret parameter known to the filter software F 62 is stored in the interpreter software 20, 71.

In the second solution the filter software F 62 authenticates the interpreter software 20, 71 using a conventional authentication process based on information sent by the interpreter software 20, 71 and combined with the secret parameter. At the level of the interpreter software 20, 71 this authentication procedure is executed by the software 72 (FIG. 8A) or the software 76 (FIG. 8B), depending on the embodiment of the terminal module concerned.

This authentication mechanism can equally be applied to messages exchanged between the programs to construct message authentication codes for guaranteeing the source and the integrity of each message transmitted.

In the case of the mode of execution described with reference to FIG. 4A, this solution nevertheless requires, for preference, physical protection of the link between the two microprocessors to be assured to prevent a hacker from reading the data exchanged and in particular the personal identification code (PIN) of the card, which the user may need to enter via the keyboard 5 to carry out transactions.

C) Protection of a secret parameter by the standard micro controller 2

The foregoing description shows the necessity of storing at least one secret parameter in the interpreter software. The mode of execution of the terminal based on a PC, in which the interpreter software executes on the PC itself, therefore offers a limited degree of security for the PC, although this degree of security is sufficient to prevent a virus substituting itself for the interpreter software. A higher degree of security is obtained by installing the interpreter software in the ROM 2c of the standard micro controller 2. For enhanced security the secret parameter of the micro controller 2 can be stored in the temporary memory when the product is manufactured or possibly on inserting the microprocessor 3 if it is removable, or on an integrated circuit card. The aim of this operation is to establish confidence between the two microprocessors. All necessary precautions must be taken at the time of this operation to assure the authenticity of the micro controller 2 (operation effected by the manufacturer, operation protected by transport keys stored in the temporary memory of the micro controller 2 by the manufacturer, and knowledge of which is a precondition for initialising said secret parameter). In addition, conventional mechanisms for detecting intrusion (contacts, etc) will be fitted to erase the temporary memory in the event of intrusion (by cutting off the power supply, etc).

D) Mutual authentication and setting up of a secure communication channel between the microprocessor of the integrated circuit card and the secure microprocessor of the terminal module This mutual authentication and the setting up of the secure communication channel are effected by mechanisms identical to those used by the standard micro controller 2 and the secure microprocessor executing the filter software, as described under B) above.

E) Authentication of the terminal module

It is important to guard against any attack on the combination of the keyboard 5, display 4 and secure microprocessor 3 with the aim of counterfeiting the terminal module, for example, substituting a counterfeit terminal module for a real terminal module in order to recover information entered by the user (keyboard spy), access the secrets of an integrated circuit card, falsify signatures.

To this end a mechanism can be added to enable the user to authenticate the terminal.

This objective is achieved by an automatic personalisation process.

Authentication of the terminal module alone

Figure 11:
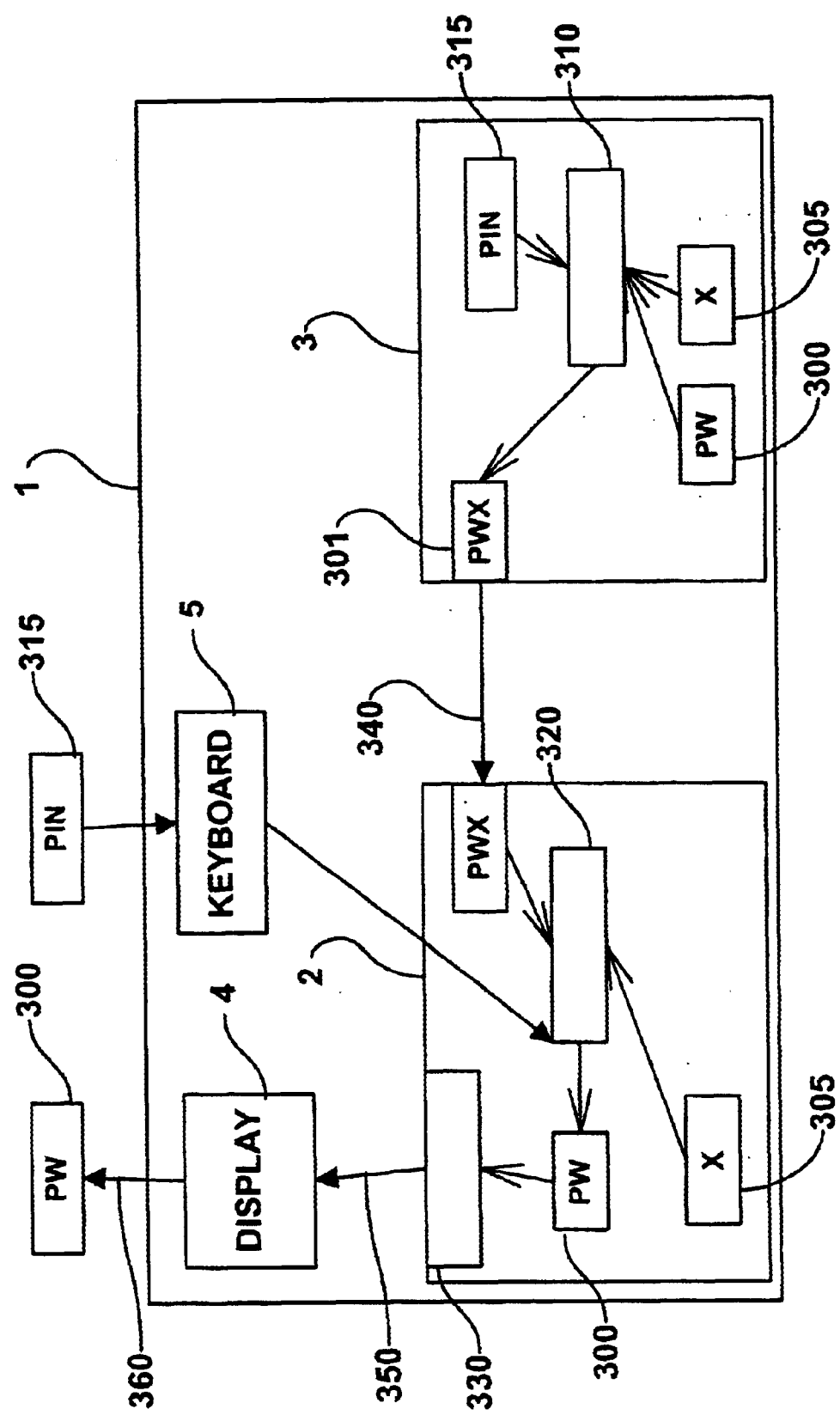
FIG. 11 is a diagram illustrating means for authentication of the terminal module.

Referring to FIG. 11, personalization can consist in calculating a password 300 that is easy to remember and that is generated 310 and displayed 330, 350, 360 by the terminal in accordance with secret parameters contained in the microprocessor or microprocessors of the terminal when the user enters a PIN. If the terminal 1 includes two microprocessors 2, 3, for example, the password 300 is stored in the secure microprocessor 3, encrypted 310 using the PIN 315 and a secret key X 305, and then sent to the micro controller 2 where it is decrypted 320 using the key X 305 also stored in the micro controller 2 and the PIN 315 entered by the user. This mechanism aims to protect against substitution of one of the two microprocessors.

Figure 12:
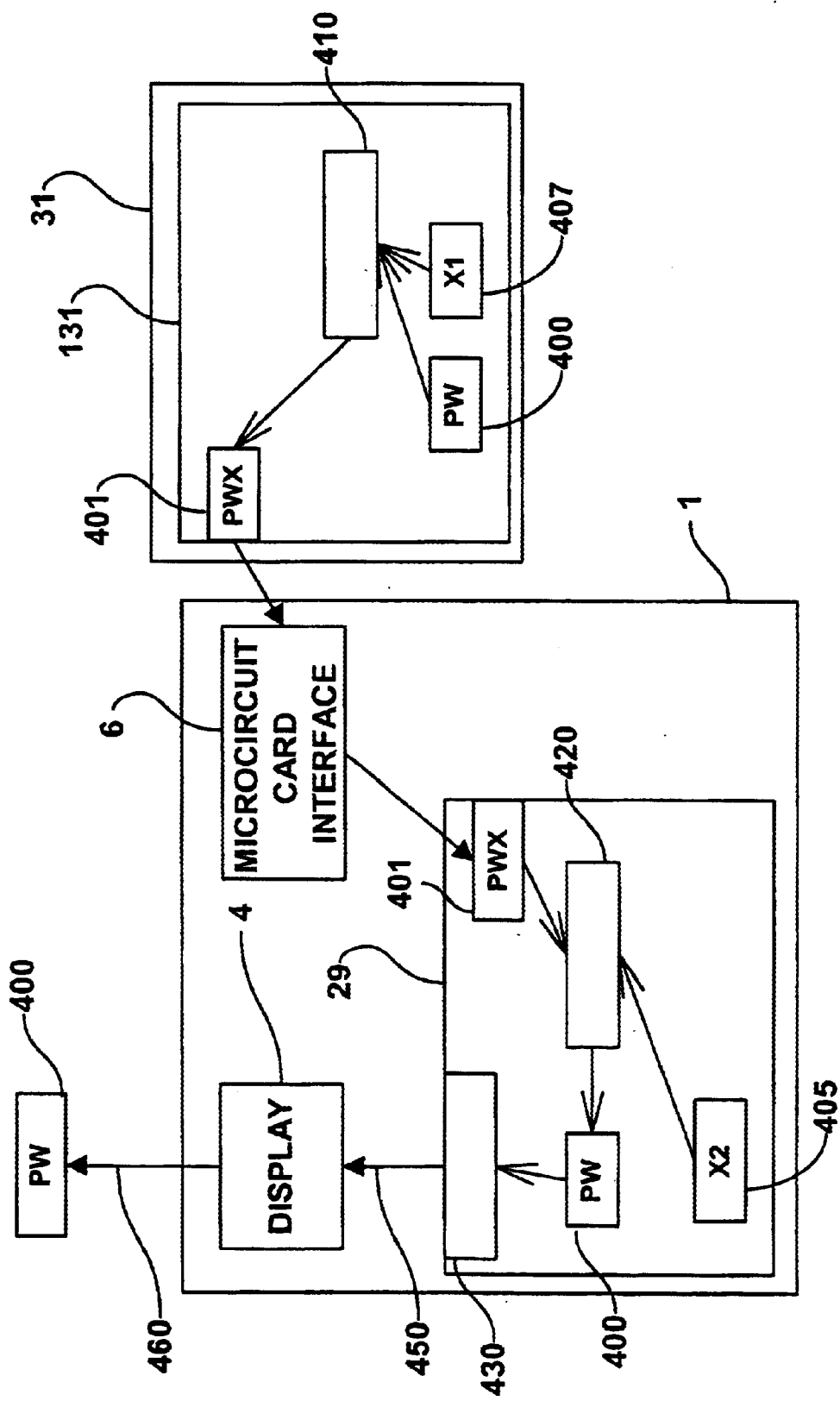
FIG. 12 is a diagram illustrating means for conjoint authentication of the terminal module and of the personal security device.

Referring to FIG. 12, the same principle can be applied to a card/terminal combination each time a microcircuit card is used with the terminal module. Personalization can consist used in the translation software calculating a password 400 based on secret information X1 407 held by the secure microprocessor 131 of the card 31 and secret information X2 405 held by the terminal module 1, for example. The same principle as described hereinabove can be used to calculate 420 the password 400. This password, generated 410 the first time the terminal module, is used in conjunction with the card and known to the user, is displayed 430, 450, 460 on the screen 4 when the terminal module is used again with the card. The user can therefore verify and be assured that the terminal in their possession, consisting of the terminal module connected to the card, is authentic.

F) Authentication of the microcircuit card by the terminal module

To enhance further the security of the transaction system in accordance with the invention, a conventional authentication process can be used for authentication by the terminal module 1, 101 of the microcircuit card used. An authentication process of the above kind prevents the user's personal identification number (PIN), entered by the latter into the module 1, 101 via the keyboard 5 to execute a secured transaction, from being captured by a counterfeit card substituted by a hacker for the user's authentic card and subsequently recovered by the hacker to read the PIN off the counterfeit card. This authentication can be effected by a means of a conventional challenge/response type mechanism, for example, using a secret shared between the card and the terminal module and symmetrical cryptography or, as already described, using a private key stored by the card enabling the challenge to be encrypted using an asymmetrical algorithm, the terminal module verifying the response using its public key.

The architecture of the transaction system and the security mechanisms described hereinabove make transactions effected by means of the terminal module 1, 101 highly secure.

The terminal module:
  expands the nature of the truly secure services that a microcircuit card can provide, thanks to the keyboard 5, the screen 4 and the protection of data exchanged with the user; and
  enables the card to be used in a non-secure environment (PC susceptible to viruses or pirate programs), by hermetically isolating it from this environment by means of a software and/or hardware architecture strictly controlling access to the card, i.e. controlling commands sent to the cryptographic functions on the card.

The terminal module can take various forms, for example:
  an integrated circuit card reader for connection to a computer via various interfaces (PCMCIA, etc) or not (connection to a server via modem only);
  a computer (PC) the user interfaces of which consist in the screen and the keyboard of the PC and which includes an integrated circuit card reader. The PC will include software and/or hardware means (such as a secure second microprocessor, the standard microprocessor consisting of the PC itself) for assuring the integrity and the confidentiality of the filter software. By computer is meant a PC or a PDA (Personal Digital Assistant);

a keyboard, possible provided with an LCD display screen, incorporating a secure microprocessor and an integrated circuit card interface;

a telephone, possible equipped with a display, incorporating a secure microprocessor and an integrated circuit card interface;

a cable TV network decoder (set-top box) incorporating an integrated circuit card reader connected to a TV, the telephone, a keyboard or possibly the remote controller for the decoder or the TV providing the user interface;

more generally, any equipment that can be rendered secure by incorporating a secure microprocessor in which a sensitive application can be installed or by incorporating an integrated circuit card interface enabling said equipment to be controlled by an application installed on an integrated circuit card.

The whole of the foregoing description describes a terminal to be used with an integrated circuit card or smart card. The card referred to is in fact a tool enabling the use of cryptographic functions personalised to one user by means of at least one secret parameter. The object of the invention is clearly not limited to a given form of tool such as an integrated circuit card. The invention also covers the use of personal security devices offering functions equivalent to those of an integrated circuit card but presented in a different form, such as the "iButton", "Java Ring" and "token" products.

What is claimed is:

1. A terminal that enables a user to execute secure electronic transactions in conjunction with at least one application installed on an electronic unit, said terminal comprising:
   (a) a terminal module comprising:
      (a1) first interface means for interfacing with said application and for receiving from said application high-level requests relating to said transactions,
      (a2) second interface means for interfacing with said user,
      (a3) third interface means for interfacing with a personal security device, and
      (a4) first data processing means comprising
         (a4i) at least first software means for controlling said first, second and third interface means; and
   (b) a personal security device comprising
      (b1) second data processing means comprising at least
         (b1i) second software means for executing elementary commands,
         (b1ii) means for executing cryptographic computations, and
         (b1iii) first means for securing said second data processing means against physical access and logical access by an unauthorized entity,
   wherein,
   (c) said terminal module receives said high-level requests from said application installed on said electronic unit, said high level requests being independent of said personal security device,
   (d) at least one of said terminal module and said personal security device comprises:
      (d1) at least one programmable memory for storing at least one filter program for translating said high-level requests into at least one of either:
         (d1i) of at least one elementary command or a sequence of elementary commands for being executed by said second software means of said second data processing means, or
         (d1ii) at least one sequence of data exchanges between said terminal module and said user via said second interface means, said data exchanges being executed by said first software means of said first data processing means, and
      (d2) means for protecting said filter program to prevent an unauthorized entity from either reading or modifying said filter program, and
   (e) at least one of said first data processing means of said terminal module and said second data processing means of said personal security device comprise
      (e1) a first data processing device for executing said filter program.

2. A terminal according to claim 1 wherein said first data processing device for executing the filter program comprises first means for at least one of identifying and authenticating said application installed on said electronic unit or the source of said high-level requests received from said application.

3. A terminal according to claim 2 wherein said first data processing device for executing said filter program further comprises means for verifying the integrity of data received from said application.

4. A terminal according to claim 1 wherein said first data processing device for executing said filter program comprises centralized means for controlling conditions of use of services of the personal security device in accordance with at least one of said application and the user.

5. A terminal according to claim 1 wherein said first data processing device for executing said filter program comprises:
   (i) means for commanding the loading, in a secure manner preventing physical interference and logical interference by an unauthorized entity, of said filter program into said programmable memory via one of said first interface means and said third interface means from an entity external to said terminal module, and
   (ii) first access control means for authorizing said loading of said filter program only in response to at least one predefined condition.

6. A terminal according to claim 1 further comprising second means that enables said second data processing means to authenticate said first data processing means.

7. A terminal according to claim 1 further comprising third means that enable said first data processing means to authenticate said second data processing means.

8. A terminal according to claim 6 or claim 7 further comprising (i) a first communication channel between said first data processing means and said second data processing means, said first communication channel including said third interface means and (ii) first means for securing said first communication channel against access by an unauthorized entity.

9. A terminal according to claim 1 further comprising fourth means that enable said user to authenticate said terminal module, independently of said personal security device.

10. A terminal according to claim 9 wherein said fourth means comprise:
    means for calculating, on the basis of a first secret parameter stored in said first data processing means, a password known to said user using said first data processing means and means for presenting said calculated password to said user via said second interface means.

11. A terminal according to claim 1 further comprising fifth means that enable said user to conjointly authenticate said terminal module and said personal security device.

12. A terminal according to claim 11 wherein said fifth means comprise:

means for computing, on the basis of at least second and third secret paramters stored respectively in memory in said first data processing means and in memory in said second data processing means, a password known to said user said using said first data processing device for executing said filter program and means for presenting said computed password to said user via said second interface means.

13. A terminal according to claim 1 wherein said terminal module includes said programmable memory for storing said filter program.

14. A terminal according to claim 13 wherein said filter program generates first commands for implementing said at least one sequence of data exchanges between said terminal module and said user and wherein:

said first data processing means comprise
 (i) a first microprocessor for controlling at least said second interface means, said first microprocessor being programmed by virtue of said first software means to execute said first commands generated by said filter program and sent to said first microprocessor for implementing said at least one sequence of data exchanges between said terminal module and said user and
 (ii) a second microprocessor of the integrated circuit card type disposed in said terminal module and including said programmable memory, said second microprocessor executing said filter program to control said at least one sequence of data exchanges between said terminal module and said user by means of said first commands sent to said first microprocessor and for applying said at least one sequence of at least one elementary command to said second data processing means, said second microprocessor comprising second means for securing said second microprocessor against physical access and logical access by an unauthorized entity.

15. A terminal according to claim 14 wherein said first microprocessor for controlling at least the second interface means comprises a fourth secret parameter stored in memory in said first data processing means, said second microprocessor being controlled by said filter program to authenticate said first software means for controlling at least the second interface means on the basis of information sent by said first microprocessor and combined at least with said fourth secret parameter.

16. A terminal according to claim 15 further comprising
 (i) a second communication channel between said first microprocessor for controlling at least the second interface means and said second microprocessor of the first data processing means and
 (ii) third means for securing said second communication channel against access by an unauthorized entity.

17. A terminal according to claim 16 wherein said second means for securing comprise means for encryption and decryption, by said first software means and by said second microprocessor, of data sent on said second communication channel on the basis of at least a fifth secret parameter stored in memory in said first data processing means and in memory in said second data processing means.

18. A terminal according to claim 16 wherein said third securing means comprise first physical means for physically protecting said second communication channel against intrusion.

19. A terminal according to claim 15 wherein said first microprocessor of said first data processing means includes a temporary memory for storing said fifth secret parameter and second physical means for physically protecting said temporary memory against intrusion.

20. A terminal according to claim 14 wherein said second microprocessor is a microcontroller.

21. A terminal according to claim 14 wherein said second data processing means of said personal security device comprise a second data processing device for execution of said filter program in a secure manner preventing physical access and logical access by an unauthorized entity and a programmable memory for loading and storing said filter program, said first software means of said first data processing means receiving said first commands for implementing said at least one sequence of data exchanges from of one of said first data processing device and said second data processing device respectively installed in said terminal module and said personal security device.

22. A terminal according to claim 14 wherein said first microprocessor is the microprocessor of a personal computer, said personal computer being also interfaced to said secure microprocessor.

23. A terminal according to claim 13 wherein said filter program generates first commands for implementing said at least one sequence of data exchanges between said terminal module and said user and wherein:

said first data processing means comprise said first data processing device for executing said filter program, said first data processing device comprising a microprocessor for:
 (i) executing said filter program for translating said high-level requests into said at least one sequence of data exchanges between said terminal module and the user and into said at least one elementary command or said sequence of elementary commands for being executed by said second software means of said second data processing means, and
 (ii) controlling at least said second interface means using said first commands generated by said filter program to implement said at least one sequence of data exchanges between said terminal module and said user and wherein said microprocessor comprises means for securing said microprocessor against physical access and logical access by an unauthorized entity.

24. A terminal according to claim 23 wherein said microprocessor includes said programmable memory.

25. A terminal according to claim 23 wherein said programmable memory is external to said microprocessor.

26. A terminal according to claim 25 wherein said filter program is stored in encrypted form in said programmable memory and said microprocessor comprises means for reading and decrypting said filter program to enable said executing of said filter program.

27. A terminal according to claim 23 wherein said second data processing means of said personal security device comprise a second data processing device for execution of said filter program in a secure manner preventing physical access and logical access by an unauthorized entity and a programmable memory for loading and storing said filter program, said first software means of said first data processing means receiving said first commands for implementing said at least one sequence of data exchanges from one of said first data processing device and said second data processing device respectively installed in said terminal module and said personal security device.

28. A terminal according to claim 13 wherein:

said filter program comprises at least one secret parameter, and wherein said second data processing means comprise second means of conditional access control for authorizing execution of said cryptographic computations in response to elementary commands generated by said filter program only if at least a second predefined condition depending on said at least one secret parameter is satisfied.

29. A terminal according to claim 13 wherein said terminal module comprises a personal computer and wherein said programmable memory includes the hard disk of said computer.

30. A terminal according to claim 29 wherein said filter program comprises a loading/decrypting first module and an encrypting second module for said translation of said high-level requests, said first module commanding the loading of said second module into RAM of said computer and decryption of said second module for execution of said filter program by said computer.

31. A terminal according to claim 29 wherein said filter program comprises at least one first module installed on said personal computer and at least one second module installed on a security server, said personal computer and said security server being connected by a communication channel, said terminal further comprising means for enabling exchange of data between said first and second modules in a manner protecting against access by an unauthorized entity.

32. A terminal according to claim 29 wherein said personal security device is an integrated circuit card.

33. A terminal according to claim 1 wherein said personal security device includes said programmable memory for storing said filter program.

34. terminal according to claim 33 wherein said filter program generates first commands for implementing said at least one sequence of data exchanges between said terminal module and said user and wherein:

said first data processing means comprise a first microprocessor for controlling at least said second interface means, said first microprocessor means being programmed by said first software means to execute said first commands generated by said filter program and sent to said first microprocessor for implementing said at least one sequence of data exchanges between said terminal module and said user, and said second data processing means comprise a second microprocessor of the integrated circuit card type disposed in said personal security device and including said programmable memory, said second microprocessor executing (i) said filter program for controlling said at least one sequence of data exchanges between said terminal module and said user by means of said first commands sent to said first microprocessor and (ii) said elementary commands, said second microprocessor comprising means for securing said second microprocessor against physical access and logical access by an unauthorized entity.

35. A terminal according to claim 34 wherein said first microprocessor for controlling at least said second interface means comprises one fourth secret parameter stored in memory in said first data processing means and wherein said second microprocessor of said personal security device is controlled by said filter program to authenticate said first microprocessor on the basis of information sent by said first microprocessor and combined at least with said fourth secret parameter.

36. A terminal according to claim 34 wherein said second microprocessor of said personal security device commands the loading of said filter program into said programmable memory via said first interface means and said third interface means.

37. A terminal according to claims 13 or 33 wherein said terminal module comprises an integrated circuit card reader and wherein said personal security device comprises an integrated circuit card.

38. A system for performing secure transactions comprising at least one terminal according to claim 1 and at least one electronic unit including means for transmitting said high-level requests to said terminal.

39. A system according to claim 38 wherein said at least one terminal comprises a plurality of terminals, wherein at least one server constitutes said electronic unit and wherein said system further comprises means for sending digital data between said at least one server and said plurality of terminals.

40. A system according to claim 1 wherein said programmable memory is a reprogrammable memory.

* * * * *